(12) United States Patent
Moroguchi et al.

(10) Patent No.: US 12,485,492 B2
(45) Date of Patent: Dec. 2, 2025

(54) CUTTING INSERT AND PROCESSING METHOD

(71) Applicant: SUMITOMO ELECTRIC HARDMETAL CORP., Hyogo (JP)

(72) Inventors: Hironari Moroguchi, Hyogo (JP); Aya Yoshimura, Hyogo (JP); Yusuke Matsuda, Hyogo (JP); Satoru Kukino, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 0 days.

(21) Appl. No.: 19/114,970

(22) PCT Filed: May 31, 2023

(86) PCT No.: PCT/JP2023/020257
§ 371 (c)(1),
(2) Date: Mar. 25, 2025

(87) PCT Pub. No.: WO2024/247156
PCT Pub. Date: Dec. 5, 2024

(65) Prior Publication Data
US 2025/0256336 A1 Aug. 14, 2025

(51) Int. Cl.
*B23B 27/20* (2006.01)
(52) U.S. Cl.
CPC ........ *B23B 27/20* (2013.01); *B23B 2200/201* (2013.01); *B23B 2200/204* (2013.01); *B23B 2200/286* (2013.01); *B23B 2226/31* (2013.01)

(58) Field of Classification Search
CPC ... B23B 27/20; B23B 2200/286; B23B 27/14; B23B 27/1611; B23B 2200/201;
(Continued)

(56) References Cited

U.S. PATENT DOCUMENTS 4,681,488 A * 7/1987 Markusson ............. B23C 5/202
407/113
5,921,721 A * 7/1999 Hintze ................ B23B 27/1622
407/113
(Continued)

FOREIGN PATENT DOCUMENTS

CA 2326814 A1 * 5/2001 ........... B23B 27/145
EP 1886749 A1 * 2/2008 ........... B23B 27/145
(Continued)

*Primary Examiner* — Sara Addisu
(74) *Attorney, Agent, or Firm* — Renner, Otto, Boisselle & Sklar, LLP

(57) ABSTRACT

A cutting insert includes a rake face, a flank face, and a cutting edge constituted of a ridgeline between the rake face and the flank face. The cutting edge has a first cutting edge portion for corner processing, a second cutting edge portion for low cut-in pulling processing, a third cutting edge portion for high cut-in pulling processing, a fourth cutting edge portion for finished-surface processing, a first connection cutting edge portion, a second connection cutting edge portion, and a third connection cutting edge portion. The fourth cutting edge portion is disposed between the first cutting edge portion and the second cutting edge portion. The second cutting edge portion is disposed between the fourth cutting edge portion and the third cutting edge portion. Each of the first cutting edge portion, the second cutting edge portion, and the fourth cutting edge portion has a curved shape.

11 Claims, 12 Drawing Sheets

(58) Field of Classification Search
CPC ...... B23B 2200/0423; B23B 2200/125; B23B 2200/204; B23C 5/06; B23C 5/202; B23C 2200/203
See application file for complete search history.

(56) References Cited

U.S. PATENT DOCUMENTS

| | | | | |
|---|---|---|---|---|
| 6,527,486 | B2 * | 3/2003 | Wiman | B23B 51/00 408/188 |
| 11,826,834 | B1 * | 11/2023 | Yamada | C04B 35/5831 |
| 2002/0189414 | A1 * | 12/2002 | Knapp | B23B 27/164 83/13 |
| 2004/0146365 | A1 * | 7/2004 | Usui | B23B 27/145 407/113 |
| 2005/0254908 | A1 * | 11/2005 | Norstrom | B23B 27/145 407/113 |
| 2006/0228179 | A1 * | 10/2006 | Alm | B23B 27/145 407/119 |
| 2011/0135407 | A1 * | 6/2011 | Koga | B23C 5/06 407/103 |
| 2018/0147637 | A1 | 5/2018 | Gonzui | |
| 2018/0345383 | A1 | 12/2018 | Ikeda | |
| 2020/0338645 | A1 | 10/2020 | Moroguchi et al. | |
| 2021/0339321 | A1 * | 11/2021 | Kanbara | B23C 5/06 |
| 2024/0227029 | A1 * | 7/2024 | Maeno | B23B 27/1611 |
| 2024/0300028 | A1 * | 9/2024 | Yamaguchi | B23B 27/10 |

FOREIGN PATENT DOCUMENTS

| | | | | |
|---|---|---|---|---|
| JP | 2004-237438 A | | 8/2004 | |
| JP | 2018-534159 A | | 11/2018 | |
| JP | 2020032498 A | * | 3/2020 | |
| WO | WO-2004002664 A2 | * | 1/2004 | ........... B23B 27/145 |
| WO | WO-2009029021 A1 | * | 3/2009 | ........... B23B 27/145 |
| WO | 2016/190351 A1 | | 12/2016 | |
| WO | 2017/060026 A1 | | 4/2017 | |
| WO | 2017/090770 A1 | | 6/2017 | |
| WO | WO-2019087496 A1 | * | 5/2019 | ............ B23B 27/20 |

* cited by examiner

CUTTING INSERT AND PROCESSING METHOD

This application is a national phase of International Application No. PCT/JP2023/020257 filed May 31, 2023, which is hereby incorporated herein by reference in its entirety.

TECHNICAL FIELD

The present disclosure relates to a cutting insert and a processing method.

BACKGROUND ART

WO 2019/087496 (PTL 1) discloses a cutting insert having a rake face, a flank face, and a chamfer disposed between the rake face and the flank face.

CITATION LIST

Patent Literature

PTL 1: WO 2019/087496

SUMMARY OF INVENTION

Technical Problem

For example, when high-efficiency processing for hardened steel is performed, cutting resistance becomes high, with the result that breakage of a cutting edge is likely to occur. Therefore, it is difficult to improve a tool life of a cutting insert.

It is an object of the present disclosure to provide a cutting insert to improve a tool life.

Solution to Problem

A cutting insert according to the present disclosure has a surface involved in cutting, the surface being composed of a cBN-based sintered material, a diamond-based sintered material, a ceramic, a cermet, or a cemented carbide, the cutting insert including: a rake face; a flank face; and a cutting edge constituted of a ridgeline between the rake face and the flank face. The cutting edge has a first cutting edge portion for corner processing, a second cutting edge portion for low cut-in pulling processing, a third cutting edge portion for high cut-in pulling processing, a fourth cutting edge portion for finished-surface processing, a first connection cutting edge portion that connects the first cutting edge portion and the fourth cutting edge portion, a second connection cutting edge portion that connects the second cutting edge portion and the fourth cutting edge portion, and a third connection cutting edge portion that connects the second cutting edge portion and the third cutting edge portion. The fourth cutting edge portion is disposed between the first cutting edge portion and the second cutting edge portion. The second cutting edge portion is disposed between the fourth cutting edge portion and the third cutting edge portion. Each of the first cutting edge portion, the second cutting edge portion, and the fourth cutting edge portion has a curved shape. A curvature radius of the first cutting edge portion is 0.1 mm or more and 2.4 mm or less. A curvature radius of the second cutting edge portion is 3 mm or more. A curvature radius of the fourth cutting edge portion is 3 mm or more. The third cutting edge portion has a straight line shape. Each of the first connection cutting edge portion, the second connection cutting edge portion and the third connection cutting edge portion has a curved shape.

Advantageous Effects of Invention

According to the present disclosure, it is possible to provide a cutting insert to improve a tool life.

DETAILED DESCRIPTION

Figure 1:
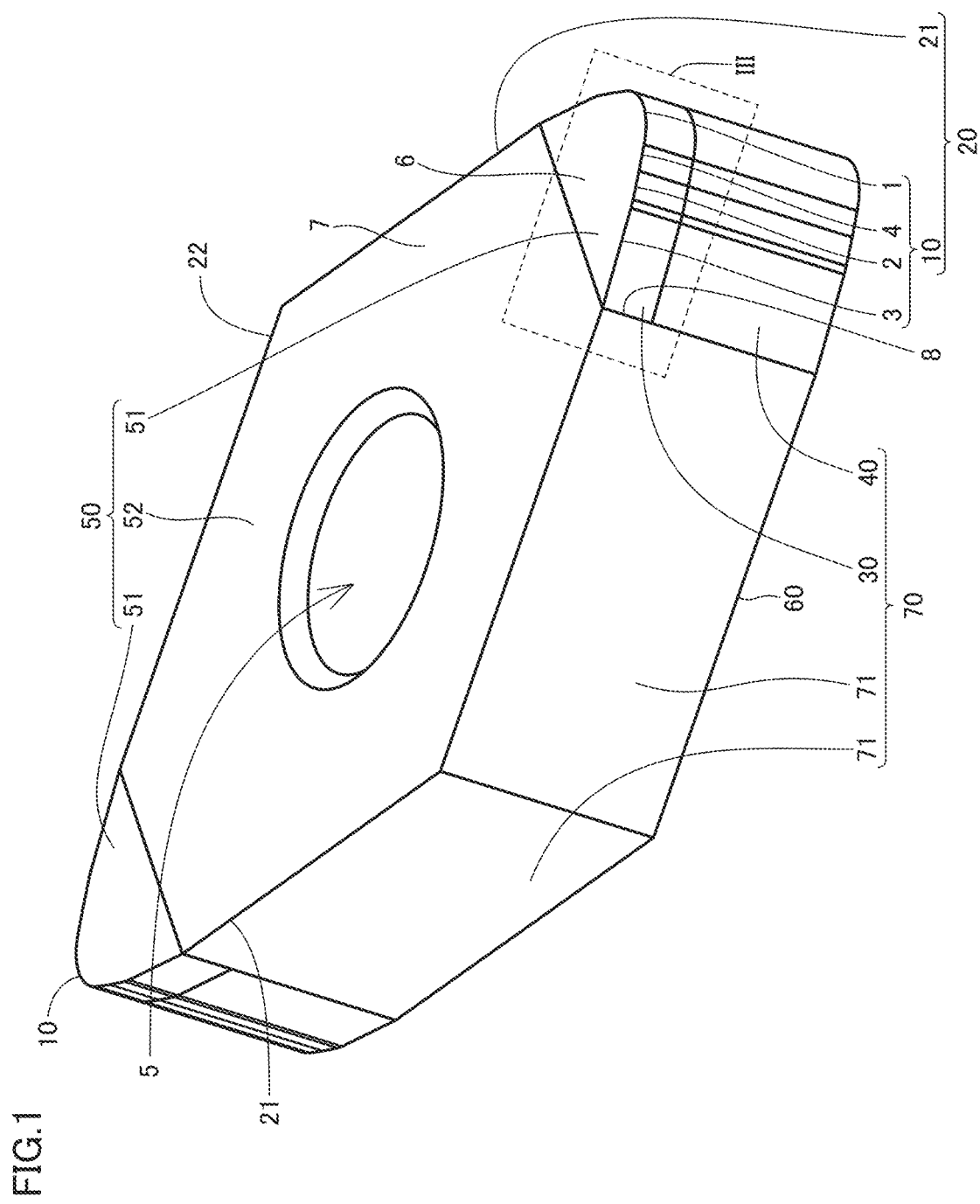
FIG. 1 is a schematic perspective view showing a configuration of a cutting insert according to a first embodiment.

Description of Embodiments of the Present Disclosure

First, embodiments of the present disclosure (also referred to as "the present embodiment") will be described.

(1) A cutting insert 100 according to the present disclosure has a surface involved in cutting, the surface being composed of a cBN-based sintered material, a diamond-based sintered material, a ceramic, a cermet, or a cemented carbide, cutting insert 100 including: a rake face 50, a flank face 70, and a cutting edge 10 constituted of a ridgeline 20 between rake face 50 and flank face 70. Cutting edge 10 has a first cutting edge portion 1 for corner processing, a second cutting edge portion 2 for low cut-in pulling processing, a third cutting edge portion 3 for high cut-in pulling processing, a fourth cutting edge portion 4 for finished-surface processing, a first connection cutting edge portion 11 that connects first cutting edge portion 1 and fourth cutting edge portion 4, a second connection cutting edge portion 12 that connects second cutting edge portion 2 and fourth cutting edge portion 4, and a third connection cutting edge portion 13 that connects second cutting edge portion 2 and third cutting edge portion 3. Fourth cutting edge portion 4 is disposed between first cutting edge portion 1 and second cutting edge portion 2. Second cutting edge portion 2 is disposed between fourth cutting edge portion 4 and third cutting edge portion 3. Each of first cutting edge portion 1, second cutting edge portion 2, and fourth cutting edge portion 4 has a curved shape. A curvature radius of first cutting edge portion 1 is 0.1 mm or more and 2.4 mm or less. A curvature radius of second cutting edge portion 2 is 3 mm or more. A curvature radius of fourth cutting edge portion 4 is 3 mm or more. Third cutting edge portion 3 has a straight line shape. Each of first connection cutting edge portion 11, second connection cutting edge portion 12, and third connection cutting edge portion 13 has a curved shape.

(2) In cutting insert 100 according to (1), a curvature radius of each of first connection cutting edge portion 11, second connection cutting edge portion 12, and third connection cutting edge portion 13 may be 0.2 mm or more.

(3) In cutting insert 100 according to (1) or (2), a flank angle of each of first cutting edge portion 1, second cutting edge portion 2, third cutting edge portion 3, and fourth cutting edge portion 4 may be 3° or more and 20° or less.

(4) In cutting insert 100 according to any one of (1) to (3), flank face 70 may have a restraint surface 71 to be restrained by a holder. When an apex angle of second cutting edge portion 2 is defined as a first angle θ8 and an apex angle of a ridgeline between restraint surface 71 and rake face 50 is defined as a second angle θ9, second angle θ9 may be smaller than first angle θ8. Second angle θ9 may be 30° or more and 80° or less.

(5) In cutting insert 100 according to any one of (1) to (3), flank face 70 may have a restraint surface 71 to be restrained by a holder. When an apex angle of second cutting edge portion 2 is defined as a first angle θ8 and an apex angle of a ridgeline between restraint surface 71 and rake face 50 is defined as a second angle θ9, second angle θ9 may be smaller than first angle θ8. First angle θ8 may be 35° or more and 85° or less.

(6) In cutting insert 100 according to (4) or (5), a flank angle of restraint surface 71 may be 0°.

(7) A processing method according to one embodiment of the present disclosure is a processing method using the cutting insert according to any one of (1) to (6), wherein in pulling processing for processing a workpiece using second cutting edge portion 2, a lateral rake angle of second cutting edge portion 2 may be −20° or more and 20° or less.

(8) In the processing method according to (7), in pulling processing for processing a workpiece using third cutting edge portion 3, a lateral rake angle of third cutting edge portion 3 may be −20° or more and 20° or less.

(9) In the processing method according to (7) or (8), second cutting edge portion 2 may be located within a range of 0.15 mm or less from a position closest to the workpiece in a direction perpendicular to a rotation axis. In the pulling processing for processing the workpiece using second cutting edge portion 2, a lateral cutting edge angle of second cutting edge portion 2 may be 70° or more and 89° or less.

(10) In the processing method according to (7) or (8), third cutting edge portion 3 may be located within a range of 0.05 mm or more and 0.5 mm or less from a position closest to the workpiece in a direction perpendicular to a rotation axis. A lateral cutting edge angle of third cutting edge portion 3 may be 60° or more and 85° or less.

(11) In the processing method according to any one of (7) to (10), a minimum value of a lateral cutting edge angle of second cutting edge portion 2 may be the same as a lateral cutting edge angle of third cutting edge portion 3.

Specific examples of a cutting insert according to an embodiment of the present disclosure will be described below with reference to figures. In the below-described figures, the same or corresponding portions are denoted by the same reference characters and will not be described repeatedly.

First Embodiment

FIG. 1 is a schematic perspective view showing a configuration of a cutting insert according to a first embodiment. As shown in FIG. 1, cutting insert 100 according to the first embodiment has a cutting edge member 6 and a base metal 7. Cutting edge member 6 is attached to base metal 7. Cutting edge member 6 is involved in cutting. The shape of base metal 7 when viewed in a plan view is not particularly limited, but is, for example, a rhombic shape. Cutting edge member 6 is joined to an acute corner portion of base metal 7. Base metal 7 is composed of, for example, a cemented carbide, a cermet, or the like. Cutting insert 100 according to the present embodiment is formed by joining cutting edge member 6 to the acute corner portion of base metal 7; however, a whole of cutting insert 100 may be constituted of cutting edge member 6.

The present disclosure is also applied to cutting inserts 100 having polygonal shapes other than the rhombic shape. Since the shapes of the cutting edges are the same thereamong, only cutting insert 100 having the rhombic shape is illustrated. The acute corner portion of base metal 7 is provided with a counterbore portion 8 obtained by partially depressing a portion of the upper surface. Cutting edge member 6 is joined to base metal 7 at counterbore portion 8 by joining means such as brazing.

Cutting edge member 6 is composed of a cBN-based sintered material, a diamond-based sintered material, a ceramic, a cermet, or a cemented carbide. The cBN-based sintered material is a sintered material including 10% or more and 99.9% or less of cBN (cubic boron nitride) in volume ratio. The diamond-based sintered material is a sintered material including 10% or more and 99.9% or less of diamond in volume ratio. The ceramic is not particularly limited; however, a ceramic such as alumina ($Al_2O_3$), silicon nitride ($Si_3N_4$), or titanium carbide (TiC) can be suitably used, for example. The cermet is not particularly limited; however, a nitride-based cermet or a carbide-based cermet can be suitably used, for example.

Cutting insert 100 according to the present embodiment has a rake face 50, a flank face 70, a cutting edge 10, and a bottom surface 60. Cutting edge 10 is constituted of a ridgeline 20 between rake face 50 and flank face 70. Ridgeline 20 has two cutting edges 10, two first ridgeline portions 21, and two second ridgeline portions 22. Each of cutting edges 10 is a part of ridgeline 20. Flank face 70 has a first flank face portion 30, a second flank face portion 40, and a restraint surface 71. First flank face portion 30 is contiguous to cutting edge 10. Second flank face portion 40 is contiguous to each of first flank face portion 30 and bottom surface 60.

Cutting edge 10 has a first cutting edge portion 1 for corner processing, a second cutting edge portion 2 for low cut-in pulling processing, a third cutting edge portion 3 for high cut-in pulling processing, and a fourth cutting edge portion 4 for finished-surface processing. Fourth cutting edge portion 4 is disposed between first cutting edge portion 1 and second cutting edge portion 2. Second cutting edge portion 2 is disposed between fourth cutting edge portion 4 and third cutting edge portion 3.

Figure 2:
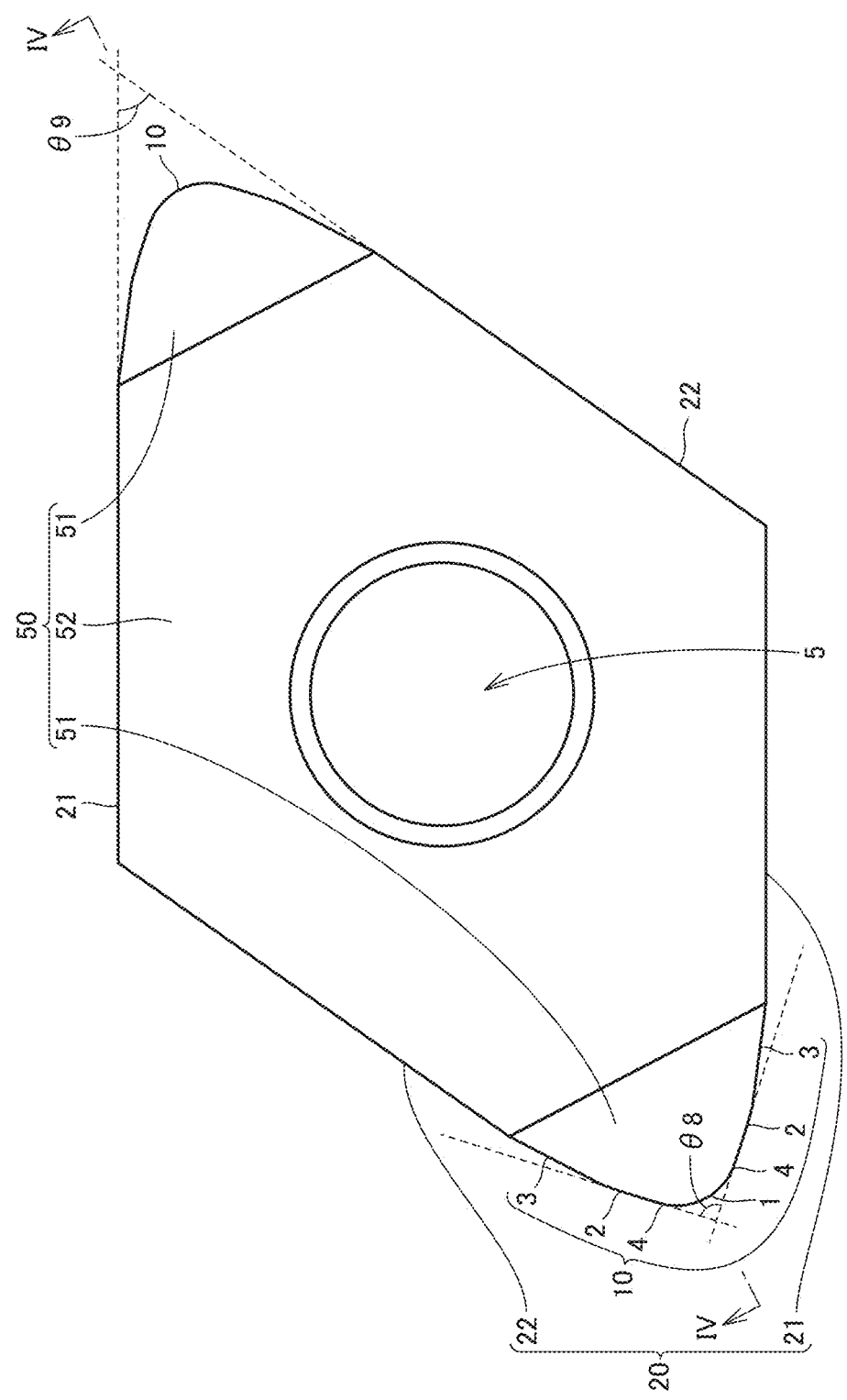
FIG. 2 is a schematic plan view showing a configuration of a cutting tool according to the first embodiment.

FIG. 2 is a schematic plan view showing a configuration of a cutting tool according to the first embodiment. The schematic plan view shown in FIG. 2 shows a state when viewed along a straight line perpendicular to rake face 50.

As shown in FIG. 2, first cutting edge portion 1 has a curved shape. First cutting edge portion 1 is curved to protrude outward. First cutting edge portion 1 is a corner cutting edge portion. The curvature radius of first cutting edge portion 1 is 0.1 mm or more and 2.4 mm or less. The curvature radius of first cutting edge portion 1 is not particularly limited, but may be 0.2 mm or more and 2.2 mm or less, 0.4 mm or more and 2.0 mm or less, or 0.6 mm or more and 1.8 mm or less.

Fourth cutting edge portion 4 has a curved shape. The curvature radius of fourth cutting edge portion 4 is 3 mm or more. The curvature radius of fourth cutting edge portion 4 is not particularly limited, but may be 5 mm or more, 10 mm or more, 20 mm or more, or 40 mm or more. The curvature radius of fourth cutting edge portion 4 may be 80 mm or less, 70 mm or less, or 60 mm or less.

Second cutting edge portion 2 has a curved shape. The curvature radius of second cutting edge portion 2 is 3 mm or more. The curvature radius of second cutting edge portion 2 is not particularly limited, but may be 5 mm or more, 10 mm or more, 20 mm or more, or 40 mm or more. The curvature radius of second cutting edge portion 2 may be 80 mm or less, 70 mm or less, or 60 mm or less. The curvature radius of second cutting edge portion 2 may be different from or the same as the curvature radius of fourth cutting edge portion 4.

Third cutting edge portion 3 has a straight line shape. The length of third cutting edge portion 3 may be longer than the length of second cutting edge portion 2. The length of second cutting edge portion 2 is a length measured when second cutting edge portion 2 having the curved shape is formed into a straight line shape. The length of third cutting edge portion 3 is, for example, 0.5 mm or more and 5.0 mm or less.

As shown in FIG. 2, rake face 50 has a first rake face portion 51 and a second rake face portion 52. First rake face portion 51 is constituted of cutting edge member 6. Second rake face portion 52 is constituted of base metal 7. A through hole 5 is formed in second rake face portion 52.

The cutting insert according to the present embodiment has two cutting edges 10. When viewed along a straight line perpendicular to rake face 50, through hole 5 is located between two cutting edges 10. Each of two cutting edges 10 may have one first cutting edge portion 1, two second cutting edge portions 2, two third cutting edge portions 3, and two fourth cutting edge portions 4. First cutting edge portion 1 may be located between two fourth cutting edge portions 4.

When viewed along the straight line perpendicular to rake face 50, two cutting edges 10 may have shapes line-symmetrical with respect to a straight line (diagonal line of the cutting insert) extending through two first cutting edge portions 1. Two cutting edges 10 may have shapes two-fold symmetrical with respect to an axis extending through through hole 5.

As shown in FIG. 2, each of first ridgeline portions 21 and second ridgeline portions 22 is constituted of base metal 7. Cutting edge 10 is constituted of cutting edge member 6. Two first ridgeline portions 21 face each other. Similarly, two second ridgeline portions 22 face each other. When viewed along the straight line perpendicular to rake face 50, each of two first ridgeline portions 21 has a straight line shape and each of two second ridgeline portions 22 has a straight line shape.

A first one of two third cutting edge portions 3 may be contiguous to first ridgeline portion 21, and a second one of two third cutting edge portions 3 may be contiguous to second ridgeline portion 22. The length of first ridgeline portion 21 may be longer than the length of third cutting edge portion 3 contiguous to first ridgeline portion 21. The length of second ridgeline portion 22 may be longer than the length of third cutting edge portion 3 contiguous to second ridgeline portion 22.

As shown in FIG. 2, the apex angle of second cutting edge portion 2 is defined as a first angle θ8. Specifically, when viewed along the straight line perpendicular to rake face 50, first angle θ8 is an angle formed by straight lines extending through both ends of each of two second cutting edge portions 2. Flank face 70 has restraint surface 71 to be restrained by a holder (see FIG. 1). The flank angle of restraint surface 71 is, for example, 0°. The flank angle of restraint surface 71 is an angle of restraint surface 71 with respect to a plane perpendicular to rake face 50. The apex angle of a ridgeline between restraint surface 71 and rake face 50 is defined as a second angle θ9. Specifically, when viewed along the straight line perpendicular to rake face 50, second angle θ9 is an angle formed by first ridgeline portion 21 and second ridgeline portion 22.

First angle θ8 is, for example, 70°. First angle θ8 may be 35° or more and 850 or less, 45° or more and 80° or less, or 55° or more and 75° or less. Second angle θ9 is smaller than first angle θ8. Second angle θ9 is, for example, 55°. Second angle θ9 may be 30° or more and 80° or less, 35° or more and 70° or less, or 40° or more and 60° or less.

At a contact point between first ridgeline portion 21 and third cutting edge portion 3, third cutting edge portion 3 may be inclined with respect to first ridgeline portion 21. Similarly, at a contact point between second ridgeline portion 22 and third cutting edge portion 3, third cutting edge portion 3 may be inclined with respect to second ridgeline portion 22. The apex angle of third cutting edge portion 3 may be smaller than first angle θ8. The apex angle of third cutting edge portion 3 may be larger than second angle θ9. The apex angle of third cutting edge portion 3 is an angle formed by two third cutting edge portions 3 when viewed along a straight line perpendicular to rake face 50.

Figure 3:
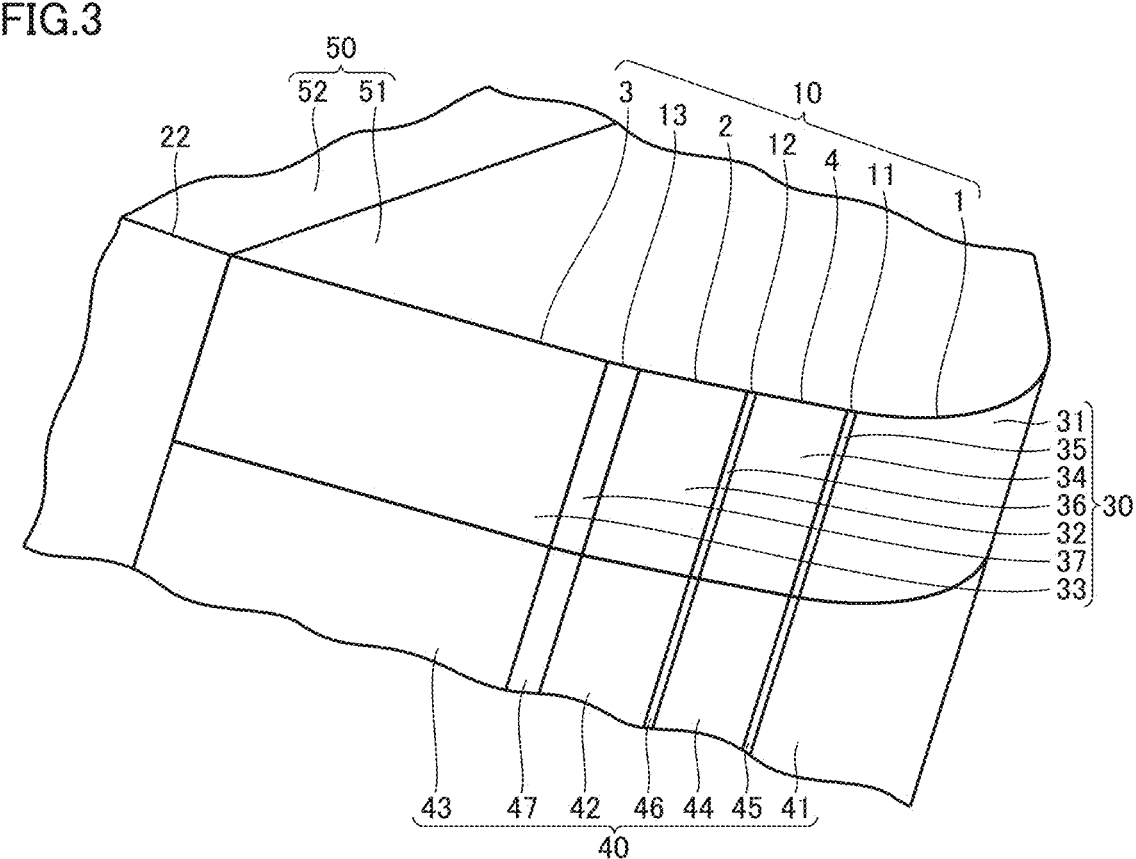
FIG. 3 is an enlarged schematic diagram of a region III in FIG. 1.

FIG. 3 is an enlarged schematic view of a region III in FIG. 1. As shown in FIG. 3, cutting edge 10 has a first connection cutting edge portion 11, a second connection cutting edge portion 12, and a third connection cutting edge portion 13. First connection cutting edge portion 11 connects first cutting edge portion 1 and fourth cutting edge portion 4. First connection cutting edge portion 11 is located between first cutting edge portion 1 and fourth cutting edge portion 4. Second connection cutting edge portion 12 connects second cutting edge portion 2 and fourth cutting edge portion 4. Second connection cutting edge portion 12 is located between second cutting edge portion 2 and fourth cutting edge portion 4. Third connection cutting edge portion 13 connects second cutting edge portion 2 and third cutting edge portion 3. Third connection cutting edge portion 13 is located between second cutting edge portion 2 and third cutting edge portion 3.

When viewed along the straight line perpendicular to rake face 50, each of first connection cutting edge portion 11, second connection cutting edge portion 12, and third connection cutting edge portion 13 has a curved shape. Each of first connection cutting edge portion 11, second connection cutting edge portion 12, and third connection cutting edge portion 13 is curved to protrude outward. The curvature radius of third connection cutting edge portion 13 may be larger than the curvature radius of each of first connection cutting edge portion 11 and second connection cutting edge portion 12.

The curvature radius of each of first connection cutting edge portion 11, second connection cutting edge portion 12, and third connection cutting edge portion 13 may be, for example, 0.2 mm or more. The curvature radius of each of first connection cutting edge portion 11, second connection cutting edge portion 12, and third connection cutting edge portion 13 may be, for example, 0.3 mm or more, or 0.5 mm or more. The curvature radius of each of first connection cutting edge portion 11, second connection cutting edge portion 12, and third connection cutting edge portion 13 may be less than 3 mm, or less than 2 mm.

First connection cutting edge portion 11 and each of first cutting edge portion 1 and fourth cutting edge portion 4 adjacent thereto may have different curvature radii. Second connection cutting edge portion 12 and each of second cutting edge portion 2 and fourth cutting edge portion 4 adjacent thereto may have different curvature radii. Third connection cutting edge portion 13 and each of second cutting edge portion 2 and third cutting edge portion 3 adjacent thereto may have different curvature radii.

As shown in FIG. 3, first flank face portion 30 has a first flank face region 31, a second flank face region 32, a third flank face region 33, a fourth flank face region 34, a fifth flank face region 35, a sixth flank face region 36, and a seventh flank face region 37. First flank face region 31 is contiguous to first cutting edge portion 1. Second flank face region 32 is contiguous to second cutting edge portion 2. Third flank face region 33 is contiguous to third cutting edge portion 3. Fourth flank face region 34 is contiguous to fourth cutting edge portion 4.

Fifth flank face region 35 is connected to first connection cutting edge portion 11. Sixth flank face region 36 is contiguous to second connection cutting edge portion 12. Seventh flank face region 37 is contiguous to third connection cutting edge portion 13. Each of first flank face region 31, second flank face region 32, third flank face region 33, fourth flank face region 34, fifth flank face region 35, sixth flank face region 36, and seventh flank face region 37 is constituted of cutting edge member 6.

Second flank face portion 40 has a first side surface region 41, a second side surface region 42, a third side surface region 43, a fourth side surface region 44, a fifth side surface region 45, a sixth side surface region 46, and a seventh side surface region 47. First side surface region 41 is contiguous to each of first flank face region 31 and bottom surface 60. Second side surface region 42 is contiguous to each of second flank face region 32 and bottom surface 60. Third side surface region 43 is contiguous to each of third flank face region 33 and bottom surface 60. Fourth side surface region 44 is contiguous to each of fourth flank face region 34 and bottom surface 60.

Fifth side surface region 45 is contiguous to each of fifth flank face region 35 and bottom surface 60. Sixth side surface region 46 is contiguous to each of sixth flank face region 36 and bottom surface 60. Seventh side surface region 47 is contiguous to each of seventh flank face region 37 and bottom surface 60. Each of first side surface region 41, second side surface region 42, third side surface region 43, fourth side surface region 44, fifth side surface region 45, sixth side surface region 46, and seventh side surface region 47 is constituted of base metal 7.

Figure 4:
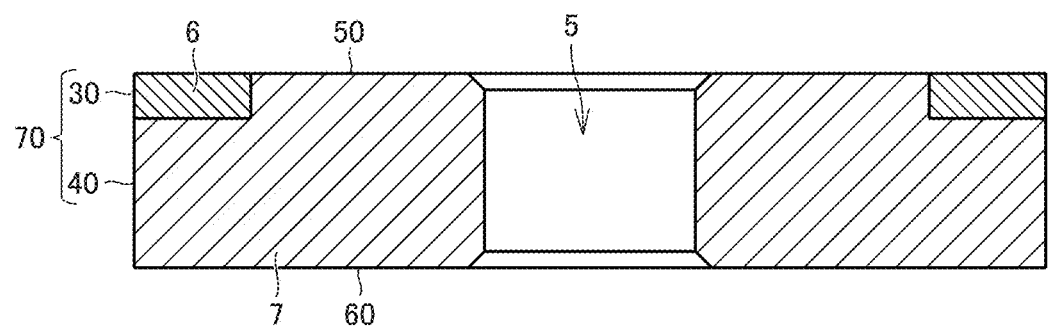
FIG. 4 is a schematic cross sectional view along a line IV-IV of FIG. 2.

FIG. 4 is a schematic cross sectional view along a line IV-IV of FIG. 2. The cross section shown in FIG. 4 extends through the midpoint of each of two first cutting edge portions 1. A straight line extending through the midpoint of each of two first cutting edge portions 1 is a diagonal line of cutting insert 100. As shown in FIG. 4, through hole 5 extends through base metal 7. Through hole 5 is opened in each of rake face 50 and bottom surface 60. Flank face 70 may be inclined perpendicularly to rake face 50. Specifically, each of first flank face portion 30 and second flank face portion 40 may be inclined perpendicularly to rake face 50.

Second Embodiment

Next, a configuration of a cutting insert 100 according to a second embodiment will be described. Cutting insert 100 according to the second embodiment is different from cutting insert 100 according to the first embodiment mainly in terms of a configuration in which the flank angle of first flank face portion 30 is 3° or more and 20° or less, and the other configurations are substantially the same as those of cutting insert 100 according to the first embodiment. Hereinafter, the configuration different from that of cutting insert 100 according to the first embodiment will be mainly described.

Figure 5:
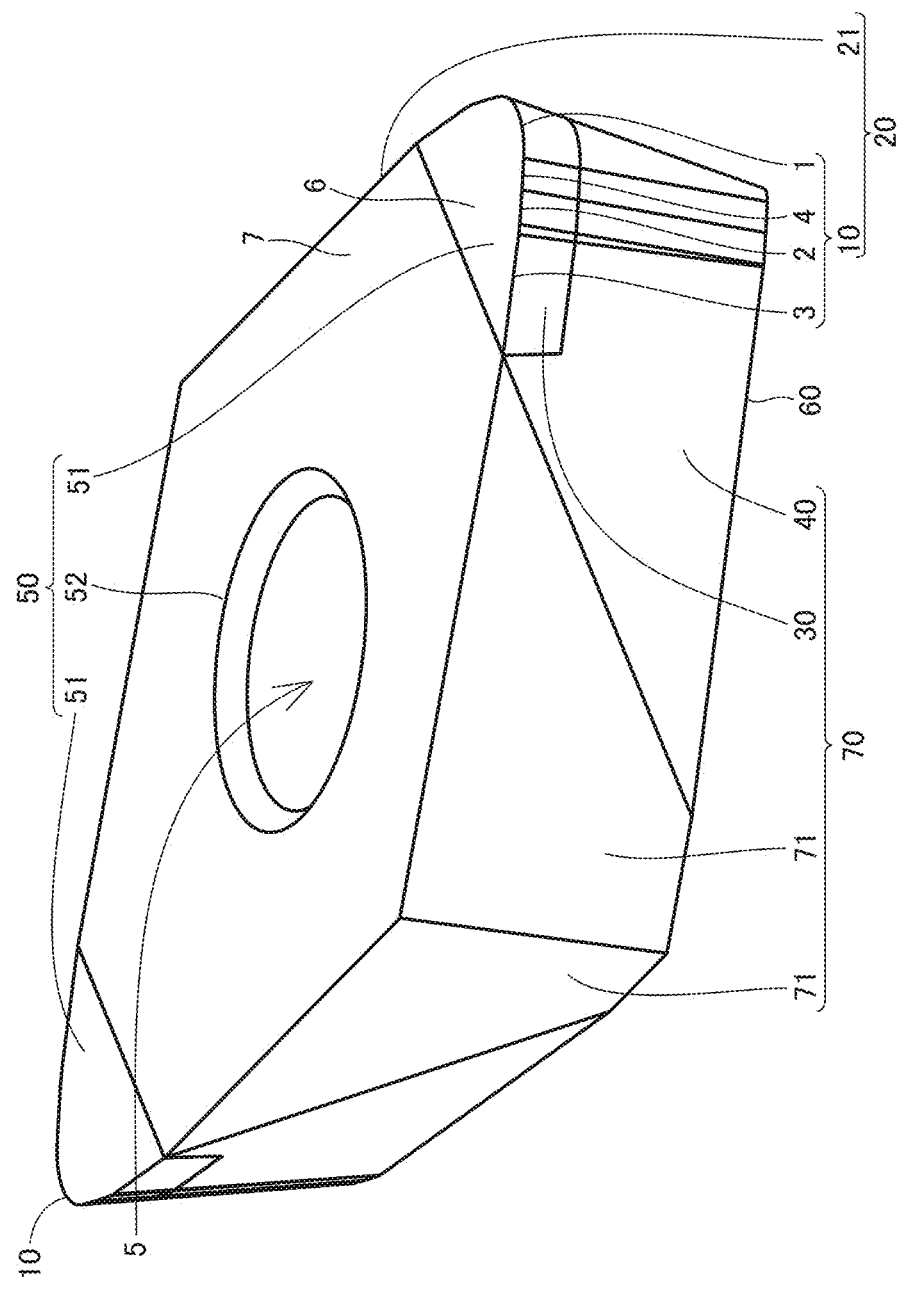
FIG. 5 is a schematic perspective view showing a configuration of a cutting insert according to a second embodiment.

FIG. 5 is a schematic perspective view showing a configuration of a cutting insert according to a second embodiment. As shown in FIG. 5, flank face 70 has holder restraint surface 71, first flank face portion 30, and second flank face portion 40. Second flank face portion 40 is contiguous to holder restraint surface 71. First flank face portion 30 is inclined inward with respect to the plane perpendicular to rake face 50. Second flank face portion 40 is inclined with respect to holder restraint surface 71. Second flank face portion 40 is constituted of the base metal. Second flank face portion 40 is contiguous to each of first flank face portion 30 and bottom surface 60.

Figure 6:
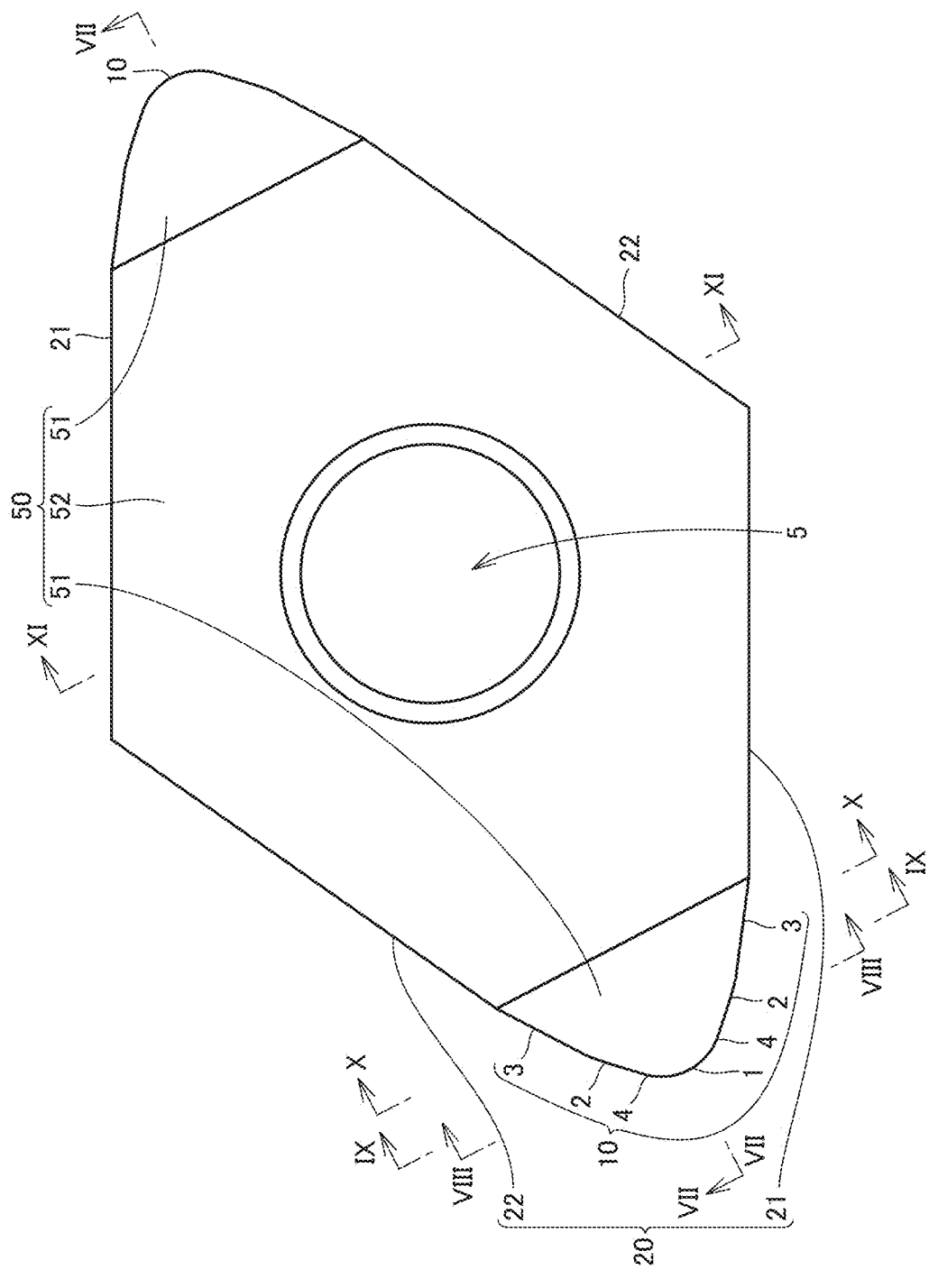
FIG. 6 is a schematic plan view showing the configuration of the cutting insert according to the second embodiment.
Figure 7:
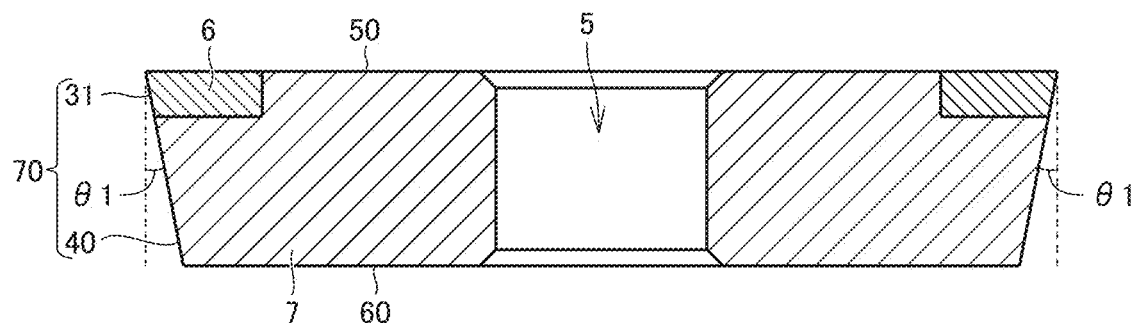
FIG. 7 is a schematic cross sectional view along a line VII-VII of FIG. 6.

FIG. 6 is a schematic plan view showing the configuration of the cutting insert according to the second embodiment. FIG. 7 is a schematic cross sectional view along a line VII-VII of FIG. 6. The cross section shown in FIG. 7 extends through the midpoint of each of two first cutting edge portions 1.

As shown in FIG. 7, the flank angle (first flank angle $\theta 1$) of first cutting edge portion 1 is an inclination angle of first flank face region 31 with respect to the plane perpendicular to rake face 50. First flank angle $\theta 1$ may be, for example, 3° or more and 20° or less, 5° or more and 18° or less, or 7° or more and 15° or less.

Figure 8:
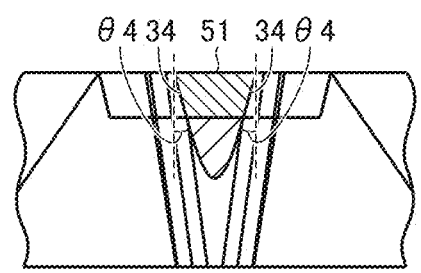
FIG. 8 is a schematic cross sectional view along a line VIII-VIII of FIG. 6.

FIG. 8 is a schematic cross sectional view along a line VIII-VIII of FIG. 6. The cross section shown in FIG. 8 intersects each of two fourth cutting edge portions 4 and is perpendicular to the diagonal line of the cutting insert. As shown in FIG. 8, fourth flank face region 34 is inclined inward with respect to the plane perpendicular to rake face 50. The flank angle (fourth flank angle $\theta 4$) of fourth cutting edge portion 4 is an inclination angle of fourth flank face region 34 with respect to the plane perpendicular to rake face 50. Fourth flank angle $\theta 4$ may be, for example, 3° or more and 20° or less, 5° or more and 18° or less, or 7° or more and 15° or less.

Figure 9:
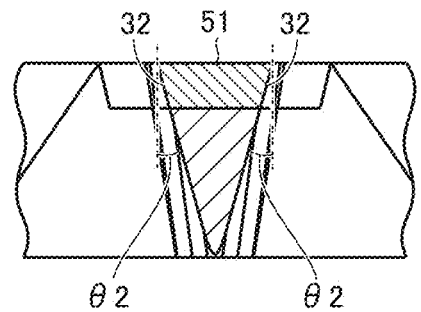
FIG. 9 is a schematic cross sectional view along a line IX-IX of FIG. 6.

FIG. 9 is a schematic cross sectional view along a line IX-IX of FIG. 6. The cross section shown in FIG. 9 intersects each of two second cutting edge portions 2 and is perpendicular to the diagonal line of the cutting insert. As shown in FIG. 9, second flank face region 32 is inclined inward with respect to the plane perpendicular to rake face 50. The flank angle (second flank angle θ2) of second cutting edge portion 2 is an inclination angle of second flank face region 32 with respect to the plane perpendicular to rake face 50. Second flank angle θ2 may be, for example, 3° or more and 20° or less, 5° or more and 18° or less, or 7° or more and 15° or less.

Figure 10:
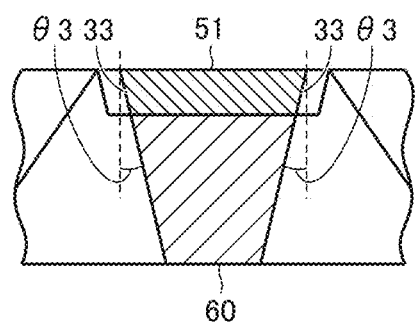
FIG. 10 is a schematic cross sectional view along a line X-X of FIG. 6.

FIG. 10 is a schematic cross sectional view along a line X-X of FIG. 6. The cross section shown in FIG. 10 intersects each of two third cutting edge portions 3 and is perpendicular to the diagonal line of the cutting insert. As shown in FIG. 10, third flank face region 33 is inclined inward with respect to the plane perpendicular to rake face 50. The flank angle (third flank angle θ3) of third cutting edge portion 3 is an inclination angle of third flank face region 33 with respect to the plane perpendicular to rake face 50. Third flank angle θ3 may be, for example, 3° or more and 20° or less, 5° or more and 18° or less, or 7° or more and 15° or less.

Figure 11:
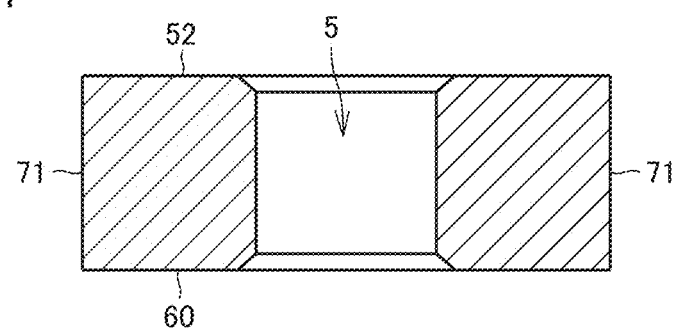
FIG. 11 is a schematic cross sectional view along a line XI-XI of FIG. 6.

FIG. 11 is a schematic cross sectional view along a line XI-XI of FIG. 6. The cross section shown in FIG. 11 intersects each of first ridgeline portion 21 and second ridgeline portion 22 and is perpendicular to the diagonal line of the cutting insert. As shown in FIG. 11, holder restraint surface 71 is perpendicular to rake face 50. The flank angle of holder restraint surface 71 is an inclination angle of holder restraint surface 71 with respect to the plane perpendicular to rake face 50. The flank angle of holder restraint surface 71 is, for example, 0°.

Next, a processing method according to the present embodiment will be described. In the processing method according to the present embodiment, a workpiece is processed using cutting insert 100 according to the present embodiment.

Figure 12:
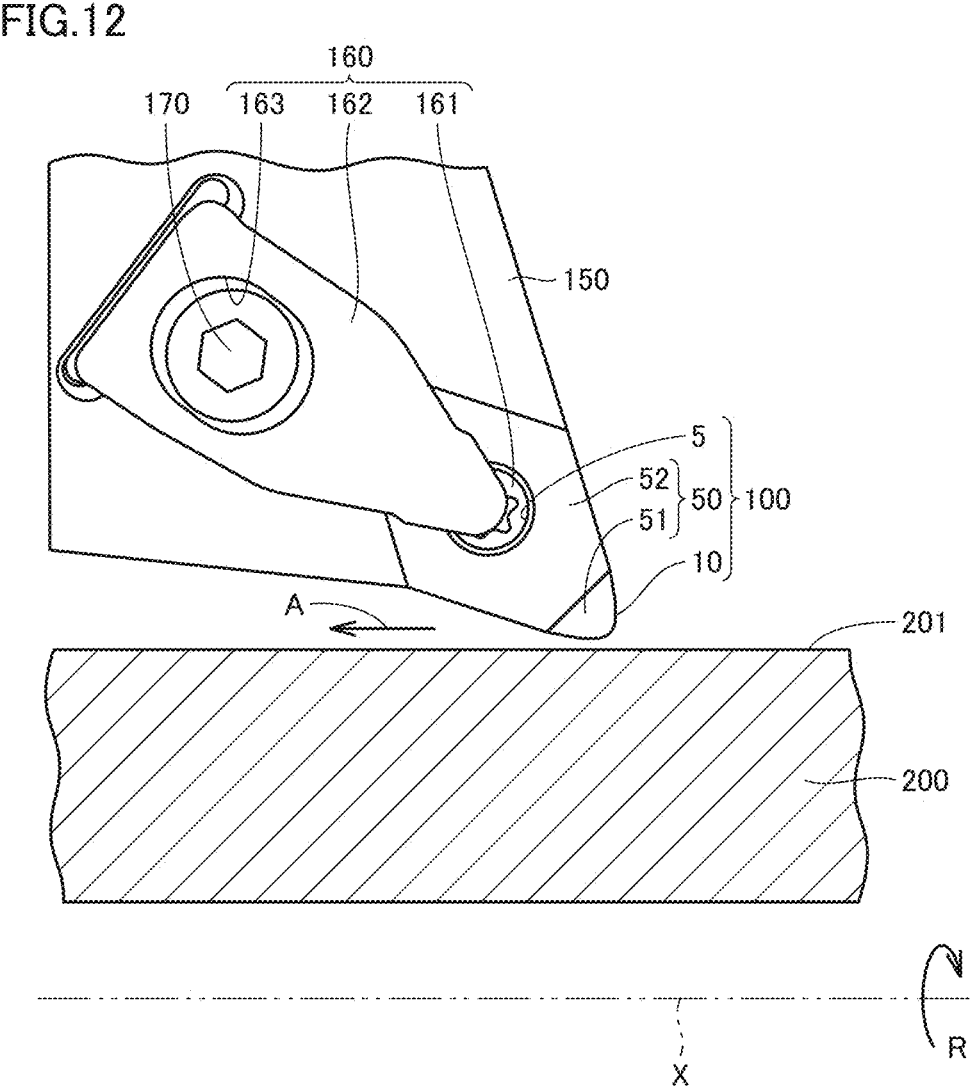
FIG. 12 is a schematic diagram showing a first processing method according to the present embodiment.

FIG. 12 is a schematic diagram showing a first processing method according to the present embodiment. As shown in FIG. 12, cutting insert 100 is attached to a holder 150 using a retention member 160. Retention member 160 has a main body portion 162 and an insertion portion 161. Insertion portion 161 is inserted into through hole 5 of cutting insert 100. An attachment hole 163 is formed in main body portion 162. A fastening screw 170 is inserted in attachment hole 163. Thus, retention member 160 is fixed to holder 150. Retention member 160 draws cutting insert 100 toward holder 150, thereby fixing cutting insert 100 to holder 150.

Cutting insert 100 according to the present embodiment can perform outer-diameter pulling processing. A workpiece 200 has an outer peripheral surface 201. The pulling processing is processing performed while moving cutting insert 100 in a first feed direction A. First feed direction A is a direction from cutting insert 100 toward holder 150. In the pulling processing, workpiece 200 is processed using cutting edge 10. First feed direction A is parallel to rotation axis X of workpiece 200. Workpiece 200 is rotated about rotation axis X in a rotation direction R.

Figure 13:
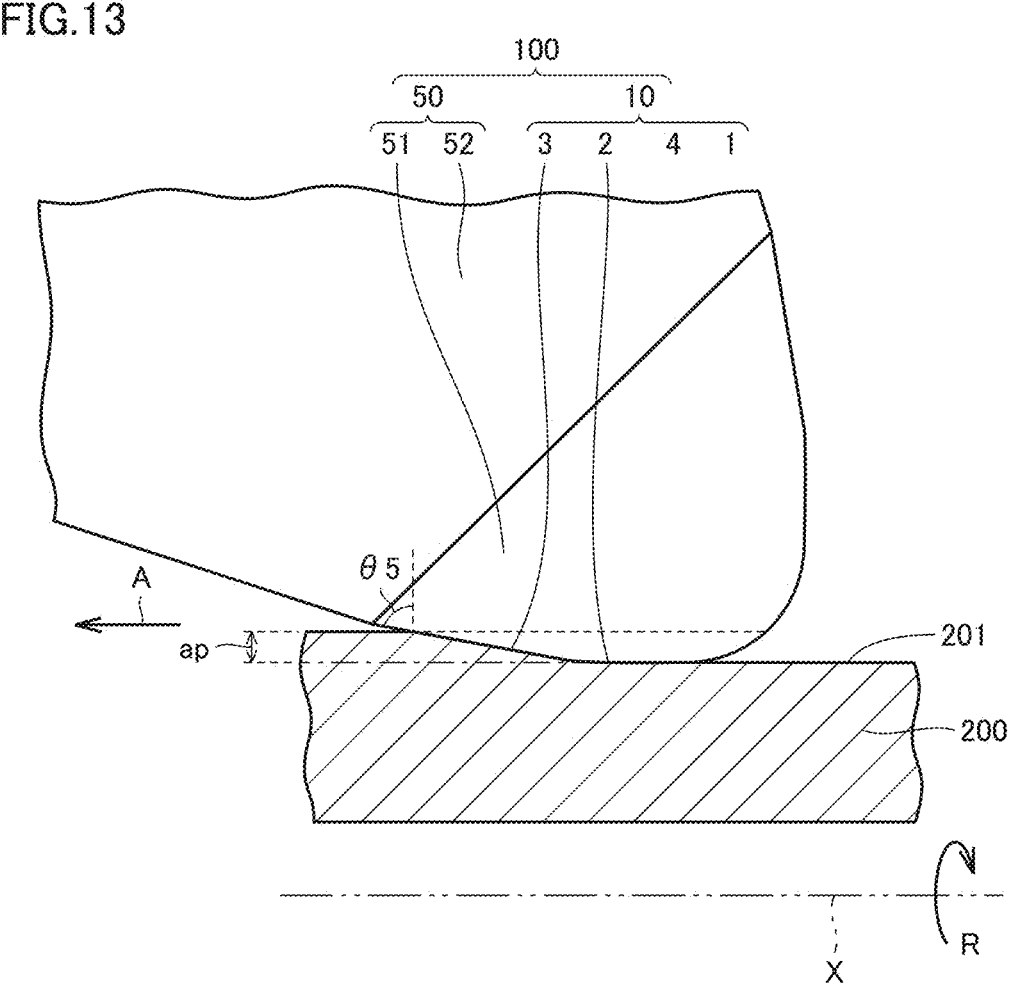
FIG. 13 is an enlarged schematic diagram showing a processing state.

FIG. 13 is an enlarged schematic diagram showing a processing state. The enlarged schematic diagram shown in FIG. 13 shows a state when viewed along the straight line perpendicular to rake face 50. Cutting edge 10 cuts into workpiece 200 by a cut-in amount ap.

As shown in FIG. 13, in the pulling processing, the lateral cutting edge angle of second cutting edge portion 2 is a fifth angle θ5. Fifth angle θ5 is an angle formed by a line tangential to cutting edge 10 at a contact point between outer peripheral surface 201 of workpiece 200 and cutting edge 10 and a straight line perpendicular to rotation axis X of workpiece 200.

Figure 14:
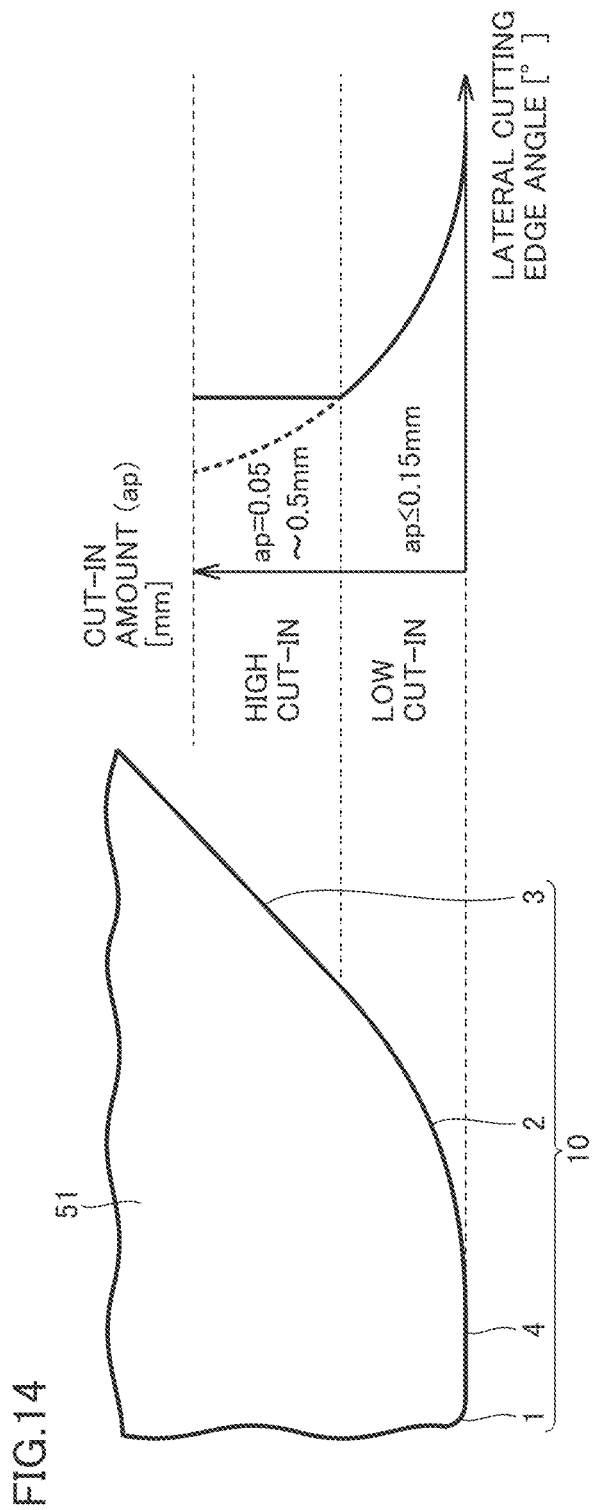
FIG. 14 is a schematic diagram showing a relation between a cut-in amount and a lateral cutting edge angle of the cutting edge.

FIG. 14 is a schematic diagram showing a relation between a cut-in amount and a lateral cutting edge angle of the cutting edge. As shown in FIG. 14, the lateral cutting edge angle of second cutting edge portion 2 is changed as the cut-in amount into workpiece 200 is changed. Specifically, the lateral cutting edge angle of second cutting edge portion 2 is monotonously decreased as the cut-in amount into workpiece 200 is increased.

In the pulling processing for processing workpiece 200 using second cutting edge portion 2, the lateral cutting edge angle of second cutting edge portion 2 is less than 90°. In the pulling processing for processing workpiece 200 using second cutting edge portion 2, the lateral cutting edge angle of second cutting edge portion 2 may be 70° or more and 89° or less, or may be 73° or more and 86° or less.

Second cutting edge portion 2 is used in low cut-in pulling processing. Specifically, the cut-in amount of second cutting edge portion 2 is, for example, 0.15 mm or less. The cut-in amount of second cutting edge portion 2 may be, for example, 0.1 mm or less, or 0.05 mm or less. From another viewpoint, it can be said that second cutting edge portion 2 may be located within a range of 0.15 mm or less from a position closest to workpiece 200 in the direction perpendicular to the rotation axis.

As shown in FIG. 14, when the cut-in amount into workpiece 200 is changed, the lateral cutting edge angle of third cutting edge portion 3 is not changed. Specifically, when the cut-in amount into workpiece 200 is increased, the lateral cutting edge angle of third cutting edge portion 3 is unchanged. For example, when the cut-in amount is in a range of 0.05 mm or more and 0.5 mm or less, the lateral cutting edge angle of third cutting edge portion 3 may be unchanged.

The lateral cutting edge angle of third cutting edge portion 3 is, for example, 60° or more and 85° or less. The lateral cutting edge angle of third cutting edge portion 3 may be, for example, 63° or more and 82° or less, or may be 65° or more and 80° or less. As shown in FIG. 14, the minimum value of the lateral cutting edge angle of second cutting edge portion 2 is the same as the lateral cutting edge angle of third cutting edge portion 3.

Third cutting edge portion 3 is used in high cut-in pulling processing. Specifically, the cut-in amount of third cutting edge portion 3 is, for example, 0.05 mm or more. The cut-in amount of third cutting edge portion 3 may be, for example, 0.1 mm or more, or more than 0.15 mm. The cut-in amount of third cutting edge portion 3 may be 0.5 mm or less. From another viewpoint, it can be said that third cutting edge portion 3 may be located within a range of 0.05 mm or more and 0.5 mm or less from the position closest to workpiece 200 in the direction perpendicular to the rotation axis.

Figure 15:
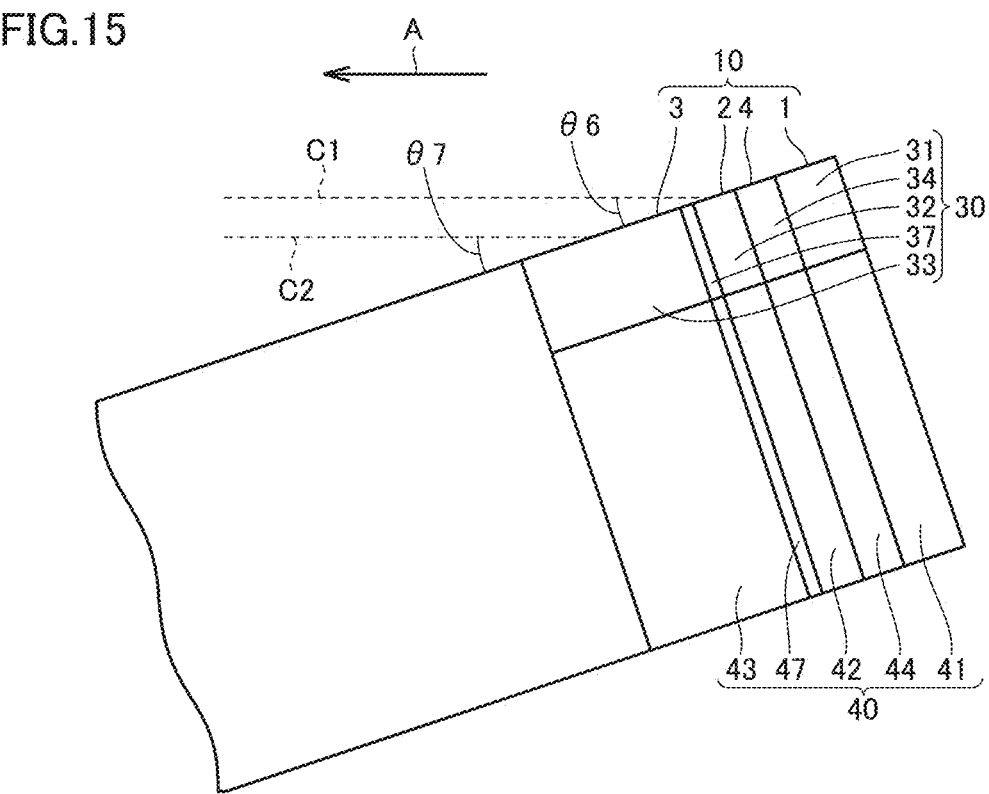
FIG. 15 is a schematic side view showing a lateral rake angle of the cutting edge.

FIG. 15 is a schematic side view showing the lateral rake angle of the cutting edge. The schematic side view shown in FIG. 15 shows a state when viewed along the straight line perpendicular to rotation axis X of workpiece 200.

In the pulling processing for processing workpiece 200 using second cutting edge portion 2, cutting insert 100 is fed in first feed direction A along a direction parallel to rotation axis X of workpiece 200.

As shown in FIG. 15, when viewed in the direction perpendicular to rotation axis X of workpiece 200, the lateral rake angle of second cutting edge portion 2 is an inclination angle of second cutting edge portion 2 with respect to a straight line C1 parallel to rotation axis X of workpiece 200. The lateral rake angle of second cutting edge portion 2 is a sixth angle θ6. Sixth angle θ6 may be, for example, −20° or more and 20° or less. Sixth angle θ6 may be −15° or more and 15° or less, or may be −10° or more and 10° or less.

In the pulling processing for processing workpiece 200 using third cutting edge portion 3, cutting insert 100 is fed in first feed direction A along a direction parallel to rotation axis X of workpiece 200.

As shown in FIG. 15, when viewed in the direction perpendicular to rotation axis X of workpiece 200, the lateral rake angle of third cutting edge portion 3 is an inclination angle of third cutting edge portion 3 with respect to a straight line C2 parallel to rotation axis X of workpiece 200. The lateral rake angle of third cutting edge portion 3 is a seventh angle θ7. Seventh angle θ7 may be, for example, −20° or more and 20° or less. Seventh angle θ7 may be −15° or more and 15° or less, or may be −10° or more and 10° or less.

It should be noted that when cutting edge 10 advances before rake face 50 during cutting, the lateral rake angle is a positive angle. On the other hand, when cutting edge 10 advances after rake face 50 during cutting, the lateral rake angle is a negative angle.

Figure 16:
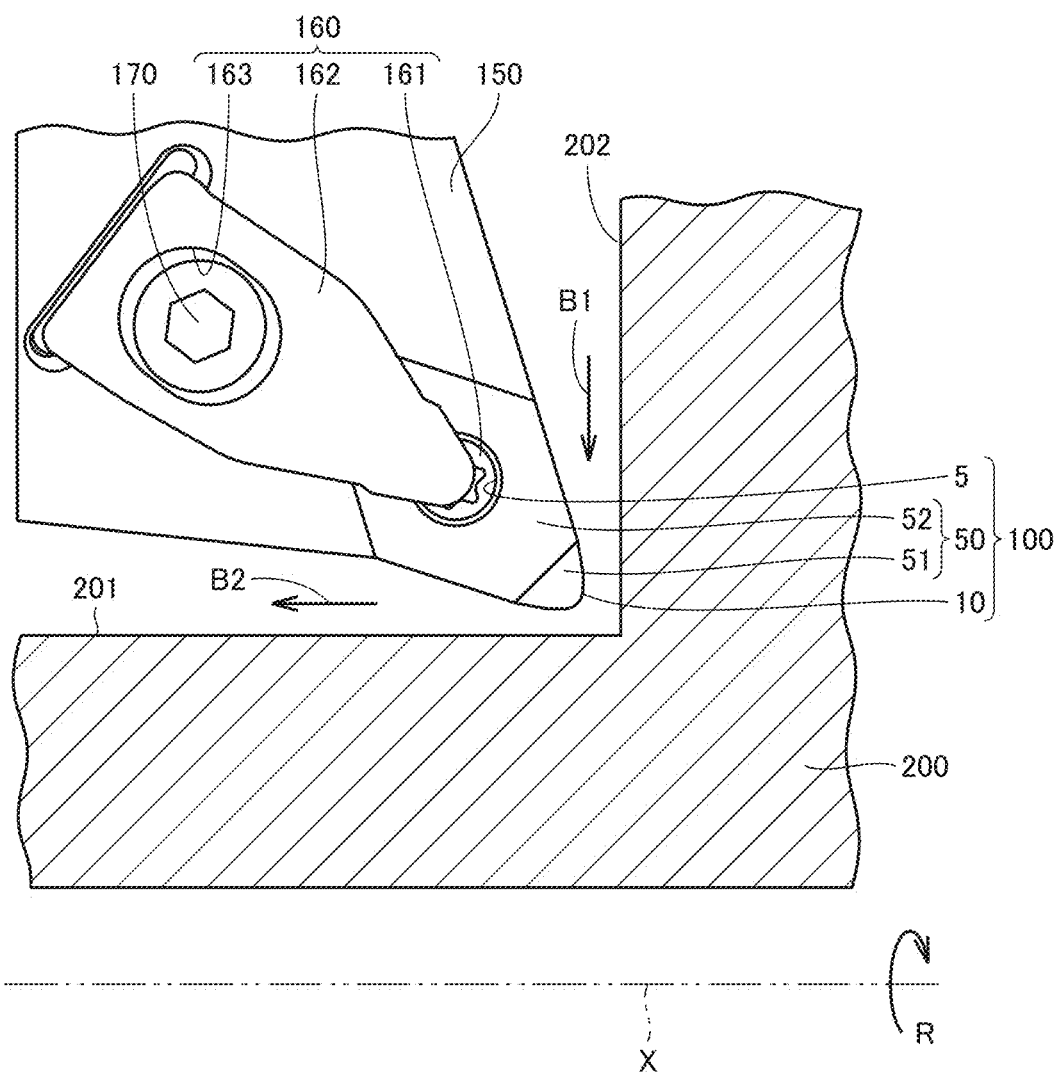
FIG. 16 is a schematic diagram showing a second processing method according to the present embodiment.

FIG. 16 is a schematic diagram showing a second processing method according to the present embodiment. As shown in FIG. 16, in the second processing method according to the present embodiment, end-surface processing and outer-diameter processing may be performed. A workpiece 200 has an outer peripheral surface 201 and an end surface 202. Outer peripheral surface 201 is parallel to rotation axis X of workpiece 200. End surface 202 is perpendicular to rotation axis X of workpiece 200. Each of pushing processing and corner processing is processing performed while moving cutting insert 100 in a second feed direction B1. In each of the pushing processing and the corner processing, workpiece 200 is processed using first cutting edge portion 1. The pulling processing is processing performed while moving cutting insert 100 in a third feed direction B2.

In the low cut-in pulling processing, workpiece 200 is processed using second cutting edge portion 2. In the high cut-in pulling processing, workpiece 200 is processed using third cutting edge portion 3. Second feed direction B1 is perpendicular to rotation axis X of workpiece 200. Third feed direction B2 is parallel to rotation axis X of workpiece 200.

Next, functions and effects of cutting insert 100 and the processing method according to the present embodiment will be described.

Cutting insert 100 according to the present embodiment has second cutting edge portion 2 for the low cut-in pulling processing and third cutting edge portion 3 for the high cut-in pulling processing. The curvature radius of second cutting edge portion 2 is 3 mm or more. Third cutting edge portion 3 has a straight line shape.

As the cut-in amount is increased, a load on cutting edge 10 is increased. In the low cut-in pulling processing, the lateral cutting edge angle of second cutting edge portion 2 is decreased as the cut-in amount is increased. By decreasing the lateral cutting edge angle as the load is increased, chipping of cutting edge 10 can be suppressed. On the other hand, when the lateral cutting edge angle is too small, stability in cutting is decreased.

In cutting insert 100 according to the present embodiment, third cutting edge portion 3 for the high cut-in pulling processing has a straight line shape. Therefore, in the high cut-in pulling processing, the lateral cutting edge angle can be maintained to be unchanged regardless of the cut-in amount. Therefore, it is possible to suppress decreased stability in cutting in the high cut-in pulling processing. Therefore, the life of cutting insert 100 can be long in each of the low cut-in pulling processing and the high cut-in pulling processing.

Furthermore, since cutting insert 100 according to the present embodiment has fourth cutting edge portion 4 for the finished-surface processing, a finished-surface roughness can be significantly improved. Therefore, an excellent surface roughness can be stably obtained even in high-efficiency processing. It should be noted that the high-efficiency processing is processing in which the volume of workpiece 200 that can be removed per unit time is, for example, 10 cm³/minute or more.

In cutting insert 100 according to the present embodiment, the flank angle of each of first cutting edge portion 1, second cutting edge portion 2, third cutting edge portion 3, and fourth cutting edge portion 4 may be 3° or more and 20° or less. Since the flank angle of each of first cutting edge portion 1, second cutting edge portion 2, third cutting edge portion 3, and fourth cutting edge portion 4 is the positive angle, cutting resistance in a thrust component force direction can be reduced. Therefore, dimensional precision can be stably improved.

In cutting insert 100 according to the present embodiment, flank face 70 may have restraint surface 71 to be restrained by a holder. When the apex angle of second cutting edge portion 2 is defined as first angle θ8 and the apex angle of the ridgeline between restraint surface 71 and rake face 50 is defined as second angle θ9, second angle θ9 may be smaller than first angle θ8. Thus, restraint force for the cutting insert by the holder can be maintained to be high while increasing the lateral cutting edge angle of second cutting edge portion 2.

In cutting insert 100 according to the present embodiment, the flank angle of restraint surface 71 may be 0°. Thus, the restraint force for the cutting insert by the holder can be maintained to be higher.

In the processing method using the cutting insert according to the present embodiment, in the pulling processing for processing workpiece 200 using second cutting edge portion 2, the lateral rake angle of second cutting edge portion 2 may be −20° or more and 20° or less. Thus, a load on second cutting edge portion 2 can be reduced. As a result, breakage of second cutting edge portion 2 can be suppressed. Therefore, the life of cutting insert 100 can be further increased.

In the processing method using the cutting insert according to the present embodiment, in the pulling processing for processing workpiece 200 using third cutting edge portion 3, the lateral rake angle of third cutting edge portion 3 may be −20° or more and 20° or less. Thus, a load on third cutting edge portion 3 can be reduced. As a result, breakage of third cutting edge portion 3 can be suppressed. Therefore, the life of cutting insert 100 can be further increased.

In the processing method using the cutting insert according to the present embodiment, second cutting edge portion 2 may be located within the range of 0.15 mm or less from the position closest to workpiece 200 in the direction perpendicular to the rotation axis. In the pulling processing for processing workpiece 200 using second cutting edge portion 2, the lateral cutting edge angle of second cutting edge portion 2 may be 70° or more and 89° or less. Thus, a load on second cutting edge portion 2 can be reduced. As a result, breakage of second cutting edge portion 2 can be suppressed. Therefore, the life of cutting insert 100 can be further increased in the low cut-in pulling processing.

In the processing method using the cutting insert according to the present embodiment, third cutting edge portion 3 may be located within the range of 0.05 mm or more and 0.5 mm or less from the position closest to workpiece 200 in the direction perpendicular to the rotation axis. The lateral cutting edge angle of third cutting edge portion 3 may be 60° or more and 85° or less. Thus, a load on third cutting edge portion 3 can be reduced. As a result, breakage of third cutting edge portion 3 can be suppressed. Therefore, the life of cutting insert 100 can be further increased in the high cut-in pulling processing.

EXAMPLES

The present embodiment will be described more specifically with reference to examples. It should be noted that the present embodiment is not limited by these examples.

Example 1: Low Cut-In Processing Conditions

Each of cutting inserts 100 (samples SA1 to SA35 and SB1 to SB9) having shapes shown in Tables 1 and 2 was produced experimentally and was evaluated in terms of cutting under the following conditions. Each of cutting inserts 100 of samples SA1 to SA35 and SB1 to SB9 has cutting edge member 6 and base metal 7 (see FIG. 1). In each of cutting inserts 100 of samples SA1 to SA35 and SB1 to SB9, the material of cutting edge member 6 was a cBN-based sintered material.

In each of Tables 1 and 2, a first cutting edge, a second cutting edge, a third cutting edge, a fourth cutting edge, a first connection portion, a second connection portion, and a third connection portion correspond to first cutting edge portion 1, second cutting edge portion 2, third cutting edge portion 3, fourth cutting edge portion 4, first connection cutting edge portion 11, second connection cutting edge portion 12, and third connection cutting edge portion 13, respectively. In each of Tables 1 and 2, a numerical value described in each of respective columns of the first cutting edge, the second cutting edge, the fourth cutting edge, the first connection portion, the second connection portion, and the third connection portion indicates the curvature radius of a corresponding portion.

TABLE 1

| Unit | First Cutting Edge mm | First Connection Portion mm | Fourth Cutting Edge mm | Second Connection Portion mm | Second Cutting Edge mm | Third Connection Portion mm | Third Cutting Edge — | Flank Angle of Each of First to Fourth Cutting Edges ° | Apex Angle of Restraint Surface ° | Flank Angle of Restraint Surface ° |
|---|---|---|---|---|---|---|---|---|---|---|
| SA1 | 0.8 | 0.8 | 20 | 0.8 | 7 | 0.8 | Straight Line | 0 | 55 | 0 |
| SA2 | 0.1 | 0.8 | 20 | 0.8 | 7 | 0.8 | Straight Line | 0 | 55 | 0 |
| SA3 | 2.4 | 0.8 | 20 | 0.8 | 7 | 0.8 | Straight Line | 0 | 55 | 0 |
| SA4 | 0.8 | 0.8 | 20 | 0.8 | 3 | 0.8 | Straight Line | 0 | 55 | 0 |
| SA5 | 0.8 | 0.8 | 20 | 0.8 | 13 | 0.8 | Straight Line | 0 | 55 | 0 |
| SA6 | 0.8 | 0.8 | 20 | 0.8 | 20 | 0.8 | Straight Line | 0 | 55 | 0 |
| SA7 | 0.8 | 0.8 | 3 | 0.8 | 7 | 0.8 | Straight Line | 0 | 55 | 0 |
| SA8 | 0.8 | 0.8 | 13 | 0.8 | 7 | 0.8 | Straight Line | 0 | 55 | 0 |
| SA9 | 0.8 | 0.8 | 20 | 0.8 | 7 | 0.8 | Straight Line | 0 | 55 | 0 |
| SA10 | 0.8 | 0.2 | 20 | 0.2 | 7 | 0.8 | Straight Line | 0 | 55 | 0 |
| SA11 | 0.8 | 0.19 | 20 | 0.19 | 7 | 0.19 | Straight Line | 0 | 55 | 0 |
| SA12 | 0.8 | 0.8 | 20 | 20 | 7 | 0.8 | Straight Line | 0 | 55 | 0 |
| SA13 | 0.8 | 0.8 | 20 | 0.8 | 7 | 7 | Straight Line | 0 | 55 | 0 |
| SA14 | 0.8 | 0.8 | 20 | 20 | 7 | 7 | Straight Line | 0 | 55 | 0 |
| SA15 | 0.8 | 0.8 | 20 | 0.8 | 7 | 0.8 | Straight Line | 2 | 55 | 0 |
| SA16 | 0.8 | 0.8 | 20 | 0.8 | 7 | 0.8 | Straight Line | 3 | 55 | 0 |
| SA17 | 0.8 | 0.8 | 20 | 0.8 | 7 | 0.8 | Straight Line | 20 | 55 | 0 |
| SA18 | 0.8 | 0.8 | 20 | 0.8 | 7 | 0.8 | Straight Line | 21 | 55 | 0 |
| SA19 | 0.8 | 0.8 | 20 | 0.8 | 7 | 0.8 | Straight Line | 0 | 30 | 0 |
| SA20 | 0.8 | 0.8 | 20 | 0.8 | 7 | 0.8 | Straight Line | 0 | 29 | 0 |
| SA21 | 0.8 | 0.8 | 20 | 0.8 | 7 | 0.8 | Straight Line | 0 | 80 | 0 |
| SA22 | 0.8 | 0.8 | 20 | 0.8 | 7 | 0.8 | Straight Line | 0 | 81 | 0 |
| SA23 | 0.8 | 0.8 | 20 | 0.8 | 7 | 0.8 | Straight Line | 0 | 55 | 5 |
| SA24 | 0.8 | 0.8 | 20 | 0.8 | 7 | 0.8 | Straight Line | 0 | 55 | 7 |

TABLE 1-continued

| Unit | First Cutting Edge mm | First Connection Portion mm | Fourth Cutting Edge mm | Second Connection Portion mm | Second Cutting Edge mm | Third Connection Portion mm | Third Cutting Edge — | Flank Angle of Each of First to Fourth Cutting Edges ° | Apex Angle of Restraint Surface ° | Flank Angle of Restraint Surface ° |
|---|---|---|---|---|---|---|---|---|---|---|
| SA25 | 0.8 | 0.8 | 20 | 0.8 | 7 | 0.8 | Straight Line | 0 | 55 | 11 |

TABLE 2

| Unit | First Cutting Edge mm | First Connection Portion mm | Fourth Cutting Edge mm | Second Connection Portion mm | Second Cutting Edge mm | Third Connection Portion mm | Third Cutting Edge — | Flank Angle of Each of First to Fourth Cutting Edges ° | Apex Angle of Restraint Surface ° | Flank Angle of Restraint Surface ° |
|---|---|---|---|---|---|---|---|---|---|---|
| SA26 | 0.8 | 0.8 | 20 | 0.8 | 7 | 0.8 | Straight Line | 0 | 55 | 0 |
| SA27 | 0.8 | 0.8 | 20 | 0.8 | 7 | 0.8 | Straight Line | 0 | 55 | 0 |
| SA28 | 0.8 | 0.8 | 20 | 0.8 | 7 | 0.8 | Straight Line | 0 | 55 | 0 |
| SA29 | 0.8 | 0.8 | 20 | 0.8 | 7 | 0.8 | Straight Line | 0 | 55 | 0 |
| SA30 | 0.8 | 0.8 | 20 | 0.8 | 7 | 0.8 | Straight Line | 0 | 55 | 0 |
| SA31 | 0.8 | 0.8 | 20 | 0.8 | 7 | 0.8 | Straight Line | 0 | 55 | 0 |
| SA32 | 0.8 | 0.8 | 20 | 0.8 | 7 | 0.8 | Straight Line | 0 | 55 | 0 |
| SA33 | 0.8 | 0.8 | 20 | 0.8 | 7 | 0.8 | Straight Line | 0 | 55 | 0 |
| SA34 | 0.8 | 0.8 | 20 | 0.8 | 7 | 0.8 | Straight Line | 0 | 55 | 0 |
| SA35 | 0.8 | 0.8 | 20 | 0.8 | 7 | 0.8 | Straight Line | 0 | 55 | 0 |
| SB1 | 0.09 | 0.8 | 20 | 0.8 | 7 | 0.8 | Straight Line | 0 | 55 | 0 |
| SB2 | 2.5 | 0.8 | 20 | 0.8 | 7 | 0.8 | Straight Line | 0 | 55 | 0 |
| SB3 | 0.8 | 0.8 | 20 | 0.8 | 2.9 | 0.8 | Straight Line | 0 | 55 | 0 |
| SB4 | 0.8 | 0.8 | 20 | 0.8 | 7 | 0.8 | R30 | 0 | 55 | 0 |
| SB5 | 0.8 | Straight Line | 20 | 0.8 | 7 | 0.8 | Straight Line | 0 | 55 | 0 |
| SB6 | 0.8 | 0.8 | 20 | Straight Line | 7 | 0.8 | Straight Line | 0 | 55 | 0 |
| SB7 | 0.8 | 0.8 | 20 | 0.8 | 7 | Straight Line | Straight Line | 0 | 55 | 0 |
| SB8 | 0.8 | 0.2 | 20 | 0.2 | Straight Line | — | — | 0 | 80 | 0 |
| SB9 | 0.8 | 0.2 | 20 | 0.2 | 3 | — | — | 0 | 80 | 0 |

Cutting inserts 100 of samples SA1 to SA35 are examples of the present disclosure. In each of cutting inserts 100 of samples SA1 to SA35, the curvature radius of first culling edge portion 1 was 0.1 mm or more and 2.4 mm or less. Fourth cutting edge portion 4 had a curved shape having a curvature radius of 3 mm or more. Second culling edge portion 2 had a curved shape having a curvature radius of 3 mm or more. Third cutting edge portion 3 had a straight line shape. Each of first connection cutting edge portion 11, second connection cutting edge portion 12, and third connection culling edge portion 13 had a curved shape.

Cutting inserts 100 of samples SB1 to SB9 are comparative examples. In cutting insert 100 of sample SB1, the curvature radius of first cutting edge portion 1 was 0.09 mm. In cutting insert 100 of sample SB2, the curvature radius of first cutting edge portion 1 was 2.5 mm. In cutting insert 100 of sample SB3, the curvature radius of second cutting edge portion 2 was 2.9 mm. In cutting insert 100 of sample SB4, third cutting edge portion 3 has a curved shape with a curvature radius of 30 mm.

In cutting insert 100 of sample SB5, first connection cutting edge portion 11 had a straight line shape. In cutting insert 100 of sample SB6, second connection cutting edge portion 12 had a straight line shape. In cutting insert 100 of sample SB7, third connection cutting edge portion 13 had a straight line shape. In cutting insert 100 of sample SB8, second cutting edge portion 2 had a straight line shape, and third connection cutting edge portion 13 and third cutting edge portion 3 were not formed. In cutting insert 100 of sample SB9, third connection cutting edge portion 13 and third cutting edge portion 3 were not formed.

A workpiece 200 below was processed under the following cutting conditions with cutting insert 100 being attached to holder 150. A cutting time (tool life) when cutting edge 10 of cutting insert 100 was broken was evaluated.

(Cutting Geometry)
  Cutting edge inclination angle=−5°
(Workpiece)
  High-hardness steel SCM415 (HRC60); diameter=85 mm; length=200 mm (Cutting Conditions)
  Cutting rate: V=250 m/min; feed rate: f=0.5 mm/rev.; cut-in amount: ap=0.05 mm; wet type
(Manner of Processing)
  Outer-diameter processing (pulling processing)

Results are collectively shown in Tables 3 and 4. As shown in Tables 3 and 4, the lateral rake angle of cutting edge 10 was −21° or more and 21° or less. The lateral cutting edge angle of second cutting edge portion 2 was 69° or more and 89° or less. Only in cutting insert 100 of sample SA35, the lateral cutting edge angle of third cutting edge portion 3 was 80°.

TABLE 3

| Unit | Lateral Rake Angle ° | Lateral Cutting Edge Angle of Second Cutting Edge ° | Position of Second Cutting Edge mm | Lateral Cutting Edge Angle of Third Cutting Edge ° | Position of Third Cutting Edge mm | Tool Life km |
|---|---|---|---|---|---|---|
| SA1 | −5 | 83 | 0.15 | — | 0.5 | 8.3 |
| SA2 | −5 | 83 | 0.15 | — | 0.5 | 5.4 |
| SA3 | −5 | 83 | 0.15 | — | 0.5 | 5.5 |
| SA4 | −5 | 80 | 0.15 | — | 0.5 | 5.2 |
| SA5 | −5 | 85 | 0.15 | — | 0.5 | 8.5 |
| SA6 | −5 | 86 | 0.15 | — | 0.5 | 8.8 |
| SA7 | −5 | 83 | 0.15 | — | 0.5 | 5.4 |
| SA8 | −5 | 83 | 0.15 | — | 0.5 | 8.6 |
| SA9 | −5 | 83 | 0.15 | — | 0.5 | 8.2 |
| SA10 | −5 | 83 | 0.15 | — | 0.5 | 6 |
| SA11 | −5 | 83 | 0.15 | — | 0.5 | 5.5 |
| SA12 | −5 | 83 | 0.15 | — | 0.5 | 7.3 |
| SA13 | −5 | 83 | 0.15 | — | 0.5 | 5.2 |
| SA14 | −5 | 83 | 0.15 | — | 0.5 | 8.8 |
| SA15 | −5 | 83 | 0.15 | — | 0.5 | 6.3 |
| SA16 | −5 | 83 | 0.15 | — | 0.5 | 6.1 |
| SA17 | −5 | 83 | 0.15 | — | 0.5 | 6 |
| SA18 | −5 | 83 | 0.15 | — | 0.5 | 5.5 |
| SA19 | −5 | 83 | 0.15 | — | 0.5 | 6.5 |
| SA20 | −5 | 83 | 0.15 | — | 0.5 | 6.2 |
| SA21 | −5 | 83 | 0.15 | — | 0.5 | 6 |
| SA22 | −5 | 83 | 0.15 | — | 0.5 | 5.1 |
| SA23 | −5 | 83 | 0.15 | — | 0.5 | 6 |
| SA24 | −5 | 83 | 0.15 | — | 0.5 | 5.8 |
| SA25 | −5 | 83 | 0.15 | — | 0.5 | 5.7 |

TABLE 4

| Unit | Lateral Rake Angle ° | Lateral Cutting Edge Angle of Second Cutting Edge ° | Position of Second Cutting Edge mm | Lateral Cutting Edge Angle of Third Cutting Edge ° | Position of Third Cutting Edge mm | Tool Life km |
|---|---|---|---|---|---|---|
| SA26 | −20 | 83 | 0.15 | — | 0.5 | 6.2 |
| SA27 | −21 | 83 | 0.15 | — | 0.5 | 5.8 |
| SA28 | 20 | 83 | 0.15 | — | 0.5 | 6 |
| SA29 | 21 | 83 | 0.15 | — | 0.5 | 5.7 |
| SA30 | −5 | 89 | 0.15 | — | 0.5 | 7.9 |
| SA31 | −5 | 70 | 0.15 | — | 0.5 | 6.4 |
| SA32 | −5 | 69 | 0.15 | — | 0.5 | 5.8 |
| SA33 | −5 | 83 | 0.1 | — | 0.5 | 6.5 |
| SA34 | −5 | 83 | 0.05 | — | 0.5 | 6.2 |
| SA35 | −5 | — | 0.04 | 80 | 0.05 | 7.9 |
| SB1 | −5 | 83 | 0.15 | — | 0.5 | 4.9 |
| SB2 | −5 | 83 | 0.15 | — | 0.5 | 4.3 |
| SB3 | −5 | 83 | 0.15 | — | 0.5 | 4.4 |
| SB4 | −5 | 83 | 0.15 | — | 0.5 | 4.2 |
| SB5 | −5 | 83 | 0.15 | — | 0.5 | 4.3 |
| SB6 | −5 | 83 | 0.15 | — | 0.5 | 4.5 |
| SB7 | −5 | 83 | 0.15 | — | 0.5 | 4.8 |

TABLE 4-continued

| Unit | Lateral Rake Angle ° | Lateral Cutting Edge Angle of Second Cutting Edge ° | Position of Second Cutting Edge mm | Lateral Cutting Edge Angle of Third Cutting Edge ° | Position of Third Cutting Edge mm | Tool Life km |
|---|---|---|---|---|---|---|
| SB8 | −5 | 85 | — | — | — | 4.5 |
| SB9 | −5 | 85 | — | — | — | 8.1 |

As shown in Tables 3 and 4, it was confirmed that each of cutting inserts 100 of samples SA1 to SA35 has a longer tool life than each of cutting inserts 100 of samples SB1 to SB7.

As indicated by each of cutting inserts 100 of samples SA1 to SA3, it was confirmed that cutting insert 100 has a long tool life when the curvature radius of first cutting edge portion 1 is 0.1 mm or more and 2.4 mm or less.

As indicated by each of cutting inserts 100 of samples SA4 to SA6, it was confirmed that cutting insert 100 has a long tool life when the curvature radius of second cutting edge portion 2 is 3 mm or more and 20 mm or less.

As indicated by each of cutting inserts 100 of samples SA7 to SA9, it was confirmed that cutting insert 100 has a long tool life when the curvature radius of fourth cutting edge portion 4 is 3 mm or more and 20 mm or less.

As indicated by each of cutting inserts 100 of samples SA15 to SA18, it was confirmed that cutting insert 100 has a long tool life when the flank angle of each of first cutting edge portion 1, second cutting edge portion 2, third cutting edge portion 3, and fourth cutting edge portion 4 is 20° or less.

As indicated by each of cutting inserts 100 of samples SA19 to SA22, it was confirmed that cutting insert 100 has a long tool life when the apex angle of holder restraint surface 71 is 30° or more and 80° or less.

As indicated by each of cutting inserts 100 of samples SA23 to SA25, it was confirmed that cutting insert 100 has a long tool life when the flank angle of holder restraint surface 71 is 11° or less.

As indicated by each of cutting inserts 100 of samples SA26 to SA29, it was confirmed that cutting insert 100 has a long tool life when the lateral rake angle of cutting edge 10 is −20° or more and 20° or less.

As indicated by each of cutting inserts 100 of samples SA30 to SA32, it was confirmed that cutting insert 100 has a long tool life when the lateral cutting edge angle of second cutting edge portion 2 is 70° or more and 89° or less.

Example 2: High Cut-In Processing Conditions

Each of cutting inserts 100 (samples SC1 to SC36 and SD1 to SD9) having shapes shown in Tables 5 and 6 was produced experimentally and was evaluated in terms of cutting under the following conditions. Each of cutting inserts 100 of samples SC1 to SC36 and SD1 to SD9 has cutting edge member 6 and base metal 7 (see FIG. 1). In each of cutting inserts 100 of samples SC1 to SC36 and SD1 to SD9, the material of cutting edge member 6 was a cBN-based sintered material.

In each of Tables 5 and 6, a first cutting edge, a second cutting edge, a third cutting edge, a fourth cutting edge, a first connection portion, a second connection portion, and a third connection portion correspond to first cutting edge portion 1, second cutting edge portion 2, third cutting edge portion 3, fourth cutting edge portion 4, first connection cutting edge portion 11, second connection cutting edge portion 12, and third connection cutting edge portion 13, respectively. In each of Tables 5 and 6, a numerical value described in each of respective columns of the first cutting edge, the second cutting edge, the fourth cutting edge, the first connection portion, the second connection portion, and the third connection portion indicates the curvature radius of a corresponding portion.

TABLE 5

| Unit | First Cutting Edge mm | First Connection Portion mm | Fourth Cutting Edge mm | Second Connection Portion mm | Second Cutting Edge mm | Third Connection Portion mm | Third Cutting Edge — | Flank Angle of Each of First to Fourth Cutting Edges ° | Apex Angle of Restraint Surface ° | Flank Angle of Restraint Surface ° |
|---|---|---|---|---|---|---|---|---|---|---|
| SC1 | 0.8 | 0.8 | 20 | 0.8 | 7 | 0.8 | Straight Line | 0 | 55 | 0 |
| SC2 | 0.1 | 0.8 | 20 | 0.8 | 7 | 0.8 | Straight Line | 0 | 55 | 0 |
| SC3 | 2.4 | 0.8 | 20 | 0.8 | 7 | 0.8 | Straight Line | 0 | 55 | 0 |
| SC4 | 0.8 | 0.8 | 20 | 0.8 | 3 | 0.8 | Straight Line | 0 | 55 | 0 |
| SC5 | 0.8 | 0.8 | 20 | 0.8 | 13 | 0.8 | Straight Line | 0 | 55 | 0 |

TABLE 5-continued

| Unit | First Cutting Edge mm | First Connection Portion mm | Fourth Cutting Edge mm | Second Connection Portion mm | Second Cutting Edge mm | Third Connection Portion mm | Third Cutting Edge — | Flank Angle of Each of First to Fourth Cutting Edges ° | Apex Angle of Restraint Surface ° | Flank Angle of Restraint Surface ° |
|---|---|---|---|---|---|---|---|---|---|---|
| SC6 | 0.8 | 0.8 | 20 | 0.8 | 20 | 0.8 | Straight Line | 0 | 55 | 0 |
| SC7 | 0.8 | 0.8 | 3 | 0.8 | 7 | 0.8 | Straight Line | 0 | 55 | 0 |
| SC8 | 0.8 | 0.8 | 13 | 0.8 | 7 | 0.8 | Straight Line | 0 | 55 | 0 |
| SC9 | 0.8 | 0.8 | 20 | 0.8 | 7 | 0.8 | Straight Line | 0 | 55 | 0 |
| SC10 | 0.8 | 0.2 | 20 | 0.2 | 7 | 0.8 | Straight Line | 0 | 55 | 0 |
| SC11 | 0.8 | 0.19 | 20 | 0.19 | 7 | 0.19 | Straight Line | 0 | 55 | 0 |
| SC12 | 0.8 | 0.8 | 20 | 20 | 7 | 0.8 | Straight Line | 0 | 55 | 0 |
| SC13 | 0.8 | 0.8 | 20 | 0.8 | 7 | 7 | Straight Line | 0 | 55 | 0 |
| SC14 | 0.8 | 0.8 | 20 | 20 | 7 | 7 | Straight Line | 0 | 55 | 0 |
| SC15 | 0.8 | 0.8 | 20 | 0.8 | 7 | 0.8 | Straight Line | 2 | 55 | 0 |
| SC16 | 0.8 | 0.8 | 20 | 0.8 | 7 | 0.8 | Straight Line | 3 | 55 | 0 |
| SC17 | 0.8 | 0.8 | 20 | 0.8 | 7 | 0.8 | Straight Line | 20 | 55 | 0 |
| SC18 | 0.8 | 0.8 | 20 | 0.8 | 7 | 0.8 | Straight Line | 21 | 55 | 0 |
| SC19 | 0.8 | 0.8 | 20 | 0.8 | 7 | 0.8 | Straight Line | 0 | 30 | 0 |
| SC20 | 0.8 | 0.8 | 20 | 0.8 | 7 | 0.8 | Straight Line | 0 | 29 | 0 |
| SC21 | 0.8 | 0.8 | 20 | 0.8 | 7 | 0.8 | Straight Line | 0 | 80 | 0 |
| SC22 | 0.8 | 0.8 | 20 | 0.8 | 7 | 0.8 | Straight Line | 0 | 81 | 0 |
| SC23 | 0.8 | 0.8 | 20 | 0.8 | 7 | 0.8 | Straight Line | 5 | 55 | 5 |
| SC24 | 0.8 | 0.8 | 20 | 0.8 | 7 | 0.8 | Straight Line | 7 | 55 | 7 |
| SC25 | 0.8 | 0.8 | 20 | 0.8 | 7 | 0.8 | Straight Line | 11 | 55 | 11 |

TABLE 6

| Unit | First Cutting Edge mm | First Connection Portion mm | Fourth Cutting Edge mm | Second Connection Portion mm | Second Cutting Edge mm | Third Connection Portion mm | Third Cutting Edge — | Flank Angle of Each of First to Fourth Cutting Edges ° | Apex Angle of Restraint Surface ° | Flank Angle of Restraint Surface ° |
|---|---|---|---|---|---|---|---|---|---|---|
| SC26 | 0.8 | 0.8 | 20 | 0.8 | 7 | 0.8 | Straight Line | 0 | 55 | 0 |
| SC27 | 0.8 | 0.8 | 20 | 0.8 | 7 | 0.8 | Straight Line | 0 | 55 | 0 |
| SC28 | 0.8 | 0.8 | 20 | 0.8 | 7 | 0.8 | Straight Line | 0 | 55 | 0 |

TABLE 6-continued

| Unit | First Cutting Edge mm | First Connection Portion mm | Fourth Cutting Edge mm | Second Connection Portion mm | Second Cutting Edge mm | Third Connection Portion mm | Third Cutting Edge — | Flank Angle of Each of First to Fourth Cutting Edges ° | Apex Angle of Restraint Surface ° | Flank Angle of Restraint Surface ° |
|---|---|---|---|---|---|---|---|---|---|---|
| SC29 | 0.8 | 0.8 | 20 | 0.8 | 7 | 0.8 | Straight Line | 0 | 55 | 0 |
| SC30 | 0.8 | 0.8 | 20 | 0.8 | 7 | 0.8 | Straight Line | 0 | 55 | 0 |
| SC31 | 0.8 | 0.8 | 20 | 0.8 | 7 | 0.8 | Straight Line | 0 | 55 | 0 |
| SC32 | 0.8 | 0.8 | 20 | 0.8 | 7 | 0.8 | Straight Line | 0 | 55 | 0 |
| SC33 | 0.8 | 0.8 | 20 | 0.8 | 7 | 0.8 | Straight Line | 0 | 55 | 0 |
| SC34 | 0.8 | 0.8 | 20 | 0.8 | 7 | 0.8 | Straight Line | 0 | 55 | 0 |
| SC35 | 0.8 | 0.8 | 20 | 0.8 | 7 | 0.8 | Straight Line | 0 | 55 | 0 |
| SC36 | 0.8 | 0.8 | 20 | 0.8 | 7 | 0.8 | Straight Line | 0 | 55 | 0 |
| SD1 | 0.09 | 0.8 | 20 | 0.8 | 7 | 0.8 | Straight Line | 0 | 55 | 0 |
| SD2 | 2.5 | 0.8 | 20 | 0.8 | 7 | 0.8 | Straight Line | 0 | 55 | 0 |
| SD3 | 0.8 | 0.8 | 20 | 0.8 | 2.9 | 0.8 | Straight Line | 0 | 55 | 0 |
| SD4 | 0.8 | 0.8 | 20 | 0.8 | 7 | 0.8 | R30 | 0 | 55 | 0 |
| SD5 | 0.8 | Straight Line | 20 | 0.8 | 7 | 0.8 | Straight Line | 0 | 55 | 0 |
| SD6 | 0.8 | 0.8 | 20 | Straight Line | 7 | 0.8 | Straight Line | 0 | 55 | 0 |
| SD7 | 0.8 | 0.8 | 20 | 0.8 | 7 | Straight Line | Straight Line | 0 | 55 | 0 |
| SD8 | 0.8 | 0.2 | 20 | 0.2 | Straight Line | — | — | 0 | 80 | 0 |
| SD9 | 0.8 | 0.2 | 20 | 0.2 | 3 | — | — | 0 | 80 | 0 |

Cutting inserts 100 of samples SC1 to SC36 are examples of the present disclosure. In each of cutting inserts 100 of samples SC1 to SC36, the curvature radius of first cutting edge portion 1 was 0.1 mm or more and 2.4 mm or less. Fourth cutting edge portion 4 had a curved shape having a curvature radius of 3 mm or more. Second culling edge portion 2 had a curved shape having a curvature radius of 3 mm or more. Third cutting edge portion 3 had a straight line shape. Each of first connection cuffing edge portion 11, second connection cutting edge portion 12, and third connection cuffing edge portion 13 had a curved shape.

Cutting inserts 100 of samples SD1 to SD9 are comparative examples. In cutting insert 100 of sample SD1, the curvature radius of first cutting edge portion 1 was 0.09 mm. In cutting insert 100 of sample SD2, the curvature radius of first cutting edge portion 1 was 2.5 mm. In cutting insert 100 of sample SD3, the curvature radius of second cutting edge portion 2 was 2.9 mm. In cutting insert 100 of sample SD4, third cutting edge portion 3 had a curved shape having a curvature radius of 30 mm.

In cutting insert 100 of sample SD5, first connection cutting edge portion 11 had a straight line shape. In cutting insert 100 of sample SD6, second connection cutting edge portion 12 had a straight line shape. In cutting insert 100 of sample SD7, third connection cutting edge portion 13 had a straight line shape. In cutting insert 100 of sample SD8, second cutting edge portion 2 had a straight line shape, and third connection cutting edge portion 13 and third cutting edge portion 3 were not formed. In cutting insert 100 of sample SD9, third connection cutting edge portion 13 and third cutting edge portion 3 were not formed.

A workpiece 200 below was processed under the following cutting conditions with cutting insert 100 being attached to holder 150. A cutting time (tool life) when cutting edge 10 of cutting insert 100 was broken was evaluated.

(Cutting Geometry)

Cutting edge inclination angle=−5°

(Workpiece)

High-hardness steel SCM415 (HRC60); diameter=85 mm; length=200 mm (Cutting Conditions)

Cutting rate: V=250 m/min; feed rate: f=0.5 mm/rev.; cut-in amount: ap=0.5 mm; wet type (Manner of Processing)

Outer-diameter processing (pulling processing)

Results are collectively shown in Tables 7 and 8. As shown in Tables 7 and 8, the lateral rake angle of cutting edge 10 was −21° or more and 21° or less. The lateral cutting edge angle of third cutting edge portion 3 was 59° or more and 86° or less. Only in each of cutting inserts 100 of samples SD8 and SD9, the lateral cutting edge angle of second cutting edge portion 2 was 85°.

TABLE 7

| Unit | Lateral Rake Angle ° | Lateral Cutting Edge Angle of Second Cutting Edge ° | Position of Second Cutting Edge mm | Lateral Cutting Edge Angle of Third Cutting Edge ° | Position of Third Cutting Edge mm | Tool Life km |
|---|---|---|---|---|---|---|
| SC1 | −5 | — | 0.15 | 80 | 0.5 | 5.8 |
| SC2 | −5 | — | 0.15 | 80 | 0.5 | 2.6 |
| SC3 | −5 | — | 0.15 | 80 | 0.5 | 3.5 |
| SC4 | −5 | — | 0.15 | 70 | 0.5 | 5.5 |
| SC5 | −5 | — | 0.15 | 80 | 0.5 | 5.7 |
| SC6 | −5 | — | 0.15 | 80 | 0.5 | 5.8 |
| SC7 | −5 | — | 0.15 | 80 | 0.5 | 5.4 |
| SC8 | −5 | — | 0.15 | 80 | 0.5 | 6 |
| SC9 | −5 | — | 0.15 | 80 | 0.5 | 6.1 |
| SC10 | −5 | — | 0.15 | 80 | 0.5 | 3.4 |
| SC11 | −5 | — | 0.15 | 80 | 0.5 | 3 |
| SC12 | −5 | — | 0.15 | 80 | 0.5 | 4.5 |
| SC13 | −5 | — | 0.15 | 80 | 0.5 | 3.5 |
| SC14 | −5 | — | 0.15 | 80 | 0.5 | 6.4 |
| SC15 | −5 | — | 0.15 | 80 | 0.5 | 3.8 |
| SC16 | −5 | — | 0.15 | 80 | 0.5 | 4.2 |
| SC17 | −5 | — | 0.15 | 80 | 0.5 | 3.4 |
| SC18 | −5 | — | 0.15 | 80 | 0.5 | 3.1 |
| SC19 | −5 | — | 0.15 | 80 | 0.5 | 4.2 |
| SC20 | −5 | — | 0.15 | 80 | 0.5 | 3.2 |
| SC21 | −5 | — | 0.15 | 80 | 0.5 | 3.5 |
| SC22 | −5 | — | 0.15 | 80 | 0.5 | 5.7 |
| SC23 | −5 | — | 0.15 | 80 | 0.5 | 3.2 |
| SC24 | −5 | — | 0.15 | 80 | 0.5 | 3.1 |
| SC25 | −5 | — | 0.15 | 80 | 0.5 | 3 |

TABLE 8

| Unit | Lateral Rake Angle ° | Lateral Cutting Edge Angle of Second Cutting Edge ° | Position of Second Cutting Edge mm | Lateral Cutting Edge Angle of Third Cutting Edge ° | Position of Third Cutting Edge mm | Tool Life km |
|---|---|---|---|---|---|---|
| SC26 | −20 | — | 0.15 | 80 | 0.5 | 3.9 |
| SC27 | −21 | — | 0.15 | 80 | 0.5 | 3.4 |
| SC28 | 20 | — | 0.15 | 80 | 0.5 | 3.6 |
| SC29 | 21 | — | 0.15 | 80 | 0.5 | 3.1 |
| SC30 | −5 | — | 0.1 | 80 | 0.5 | 3.7 |
| SC31 | −5 | — | 0.05 | 80 | 0.5 | 3.4 |
| SC32 | −5 | — | 0.15 | 60 | 0.5 | 5.9 |
| SC33 | −5 | — | 0.15 | 59 | 0.5 | 5.7 |
| SC34 | −5 | — | 0.15 | 80 | 0.5 | 6.2 |
| SC35 | −5 | — | 0.15 | 86 | 0.5 | 6.1 |
| SC36 | −5 | — | 0.04 | 80 | 0.05 | 5.3 |
| SD1 | −5 | — | 0.15 | 80 | 0.5 | 2.4 |
| SD2 | −5 | — | 0.15 | 80 | 0.5 | 1.9 |
| SD3 | −5 | — | 0.15 | 80 | 0.5 | 2.2 |
| SD4 | −5 | — | 0.15 | 80 | 0.5 | 1.6 |
| SD5 | −5 | — | 0.15 | 80 | 0.5 | 1.8 |
| SD6 | −5 | — | 0.15 | 80 | 0.5 | 2.2 |
| SD7 | −5 | — | 0.15 | 80 | 0.5 | 2.3 |
| SD8 | −5 | 85 | — | — | — | 4.8 |
| SD9 | −5 | 85 | — | — | — | 2.5 |

As shown in Tables 7 and 8, it was confirmed that each of cutting inserts 100 of samples SC1 to SC36 has a longer tool life than each of cutting inserts 100 of samples SD1 to SD7.

As indicated by each of cutting inserts 100 of samples SC1 to SC3, it was confirmed that cutting insert 100 has a long tool life when the curvature radius of first cutting edge portion 1 is 0.1 mm or more and 2.4 mm or less.

As indicated by each of cutting inserts 100 of samples SC4 to SC6, it was confirmed that cutting insert 100 has a long tool life when the curvature radius of second cutting edge portion 2 is 3 mm or more and 20 mm or less.

As indicated by each of cutting inserts 100 of samples SC7 to SC9, it was confirmed that cutting insert 100 has a long tool life when the curvature radius of fourth cutting edge portion 4 is 3 mm or more and 20 mm or less.

As indicated by each of cutting inserts 100 of samples SC15 to SC18, it was confirmed that cutting insert 100 has a long tool life when the flank angle of each of first cutting edge portion 1, second cutting edge portion 2, third cutting edge portion 3, and fourth cutting edge portion 4 is 20° or less.

As indicated by each of cutting inserts 100 of samples SC19 to SC22, it was confirmed that cutting insert 100 has a long tool life when the apex angle of holder restraint surface 71 is 30° or more and 80° or less.

As indicated by each of cutting inserts 100 of samples SC23 to SC25, it was confirmed that cutting insert 100 has a long tool life when the flank angle of holder restraint surface 71 is 11° or less.

As indicated by each of cutting inserts 100 of samples SC26 to SC29, it was confirmed that cutting insert 100 has a long tool life when the lateral rake angle of cutting edge 10 is −20° or more and 20° or less.

As indicated by each of cutting inserts 100 of samples SC32 to SC35, it was confirmed that cutting insert 100 has a long tool life when the lateral cutting edge angle of third cutting edge portion 3 is 60° or more and 86° or less.

It should be noted that each of cutting inserts 100 of samples SB8 and SD8 had a long tool life under the high cut-in processing conditions, but did not have a long tool life under the low cut-in processing conditions. Each of cutting inserts 100 of samples SB9 and SD9 had a long tool life under the low cut-in processing conditions, but did not have a long tool life under the high cut-in processing conditions.

In view of the above results, it was proved that the tool life is long under both the low cut-in processing conditions and the high cut-in processing conditions when the curvature radius of first cutting edge portion 1 is 0.1 mm or more and 2.4 mm or less, fourth cutting edge portion 4 has a curved shape having a curvature radius of 3 mm or more, second cutting edge portion 2 has a curved shape having a curvature radius of 3 mm or more, and third cutting edge portion 3 has a straight line shape.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 1 first cutting edge portion; 2 second cutting edge portion; 3 third cutting edge portion; 4 fourth cutting edge portion; 5 through hole; 6 cutting edge member; 7 base metal; 8 counterbore portion; 10 cutting edge; 11 first connection cutting edge portion; 12 second connection cutting edge portion; 13 third connection cutting edge portion; 20 ridgeline; 21 first ridgeline portion; 22 second ridgeline portion; 30 first flank face portion; 31 first flank face region; 32 second flank face region; 33 third flank face region; 34 fourth flank face region; 35 fifth flank face region; 36 sixth flank face region; 37 seventh flank face region; 40 second flank face portion; 41 first side surface region; 42 second side surface region; 43 third side surface region; 44 fourth side surface region; 45 fifth side surface region; 46 sixth side surface region; 47 seventh side surface region; 50 rake face; 51 first rake face region; 52 second rake face region; 60 bottom surface; 70 flank face; 71 holder restraint surface (restraint surface); 100 cutting insert; 150 holder; 160 retention member; 161 insertion portion; 162 main body portion, 163 attachment hole; 170 fastening screw; 200 workpiece; 201 outer peripheral surface; 202 end surface; A first feed direction; B1 second feed direction; B2 third feed direction; C1, C2 straight line; R rotation direction; X rotation axis; ap cut-in amount.

The invention claimed is:

1. A cutting insert having a surface involved in cutting, the surface being composed of a cBN-based sintered material, a diamond-based sintered material, a ceramic, a cermet, or a cemented carbide,
the cutting insert comprising: a rake face; a flank face; and a cutting edge constituted of a ridgeline between the rake face and the flank face, wherein
the cutting edge has
a first cutting edge portion for corner processing,
a second cutting edge portion for low cut-in pulling processing,
a third cutting edge portion for high cut-in pulling processing,
a fourth cutting edge portion for finished-surface processing,
a first connection cutting edge portion that connects the first cutting edge portion and the fourth cutting edge portion,
a second connection cutting edge portion that connects the second cutting edge portion and the fourth cutting edge portion, and
a third connection cutting edge portion that connects the second cutting edge portion and the third cutting edge portion,
the fourth cutting edge portion is disposed between the first cutting edge portion and the second cutting edge portion,
the second cutting edge portion is disposed between the fourth cutting edge portion and the third cutting edge portion,
each of the first cutting edge portion, the second cutting edge portion, and the fourth cutting edge portion has a curved shape,
a curvature radius of the first cutting edge portion is 0.1 mm or more and 2.4 mm or less,
a curvature radius of the second cutting edge portion is 3 mm or more,
a curvature radius of the fourth cutting edge portion is 3 mm or more,
the third cutting edge portion has a straight line shape, and
each of the first connection cutting edge portion, the second connection cutting edge portion, and the third connection cutting edge portion has a curved shape,
a curvature radius of the second cutting edge portion is smaller than a curvature radius of the fourth cutting edge portion.

2. The cutting insert according to claim 1, wherein a curvature radius of each of the first connection cutting edge portion, the second connection cutting edge portion, and the third connection cutting edge portion is 0.2 mm or more.

3. The cutting insert according to claim 1, wherein a flank angle of each of the first cutting edge portion, the second cutting edge portion, the third cutting edge portion, and the fourth cutting edge portion is 3° or more and 20° or less.

4. The cutting insert according to claim 1, wherein
the flank face has a restraint surface to be restrained by a holder, and
when an apex angle of the second cutting edge portion is defined as a first angle and an apex angle of a ridgeline between the restraint surface and the rake face is defined as a second angle,
the second angle is smaller than the first angle, and
the second angle is 30° or more and 80° or less.

5. The cutting insert according to claim 1, wherein
the flank face has a restraint surface to be restrained by a holder, and
when an apex angle of the second cutting edge portion is defined as a first angle and an apex angle of a ridgeline between the restraint surface and the rake face is defined as a second angle,
the second angle is smaller than the first angle, and
the first angle is 35° or more and 85° or less.

6. The cutting insert according to claim 4, wherein a flank angle of the restraint surface is 0°.

7. A processing method using the cutting insert according to claim 1, wherein in pulling processing for processing a workpiece using the second cutting edge portion, a lateral rake angle of the second cutting edge portion is −20° or more and 20° or less.

8. The processing method according to claim 7, wherein in pulling processing for processing a workpiece using the third cutting edge portion, a lateral rake angle of the third cutting edge portion is −20° or more and 20° or less.

9. The processing method according to claim 7, wherein
the second cutting edge portion is located within a range of 0.15 mm or less from a position closest to the workpiece in a direction perpendicular to a rotation axis, and
in the pulling processing for processing the workpiece using the second cutting edge portion, a lateral cutting edge angle of the second cutting edge portion is 70° or more and 89° or less.

10. The processing method according to claim 7, wherein
the third cutting edge portion is located within a range of 0.05 mm or more and 0.5 mm or less from a position closest to the workpiece in a direction perpendicular to a rotation axis, and
a lateral cutting edge angle of the third cutting edge portion is 60° or more and 85° or less.

11. The processing method according to claim 7, wherein a minimum value of a lateral cutting edge angle of the second cutting edge portion is the same as a lateral cutting edge angle of the third cutting edge portion.

* * * * *